US011226628B2

(12) United States Patent
Wu et al.

(10) Patent No.: US 11,226,628 B2
(45) Date of Patent: Jan. 18, 2022

(54) CROSS-STORAGE TRANSPORTATION CONTROL METHOD, APPARATUS AND SYSTEM

(71) Applicant: Hangzhou Hikrobot Technology Co., Ltd., Zhejiang (CN)

(72) Inventors: Huapeng Wu, Zhejiang (CN); Keping Zhu, Zhejiang (CN); Shengkai Li, Zhejiang (CN)

(73) Assignee: HANGZHOU HIKROBOT TECHNOLOGY CO., LTD., Zhejiang (CN)

( * ) Notice: Subject to any disclaimer, the term of this patent is extended or adjusted under 35 U.S.C. 154(b) by 227 days.

(21) Appl. No.: 16/335,730

(22) PCT Filed: Aug. 10, 2017

(86) PCT No.: PCT/CN2017/096813
§ 371 (c)(1),
(2) Date: Mar. 22, 2019

(87) PCT Pub. No.: WO2018/059136
PCT Pub. Date: Apr. 5, 2018

(65) Prior Publication Data
US 2019/0310645 A1 Oct. 10, 2019

(30) Foreign Application Priority Data
Sep. 27, 2016 (CN) .......... 201610854227.1

(51) Int. Cl.
G05D 1/02 (2020.01)
G06F 16/29 (2019.01)
(Continued)

(52) U.S. Cl.
CPC ......... G05D 1/0212 (2013.01); G01C 21/206 (2013.01); G05B 19/41895 (2013.01);
(Continued)

(58) Field of Classification Search
CPC .......... G05D 2201/0216; G05D 1/021; G01C 21/206; G05B 19/41895; G06Q 50/28; G06K 7/10099
See application file for complete search history.

(56) References Cited

U.S. PATENT DOCUMENTS 4,887,223 A * 12/1989 Christian ............. G05D 1/0234
382/153
4,987,540 A * 1/1991 Luke, Jr. .............. G05D 1/0265
180/168
(Continued)

FOREIGN PATENT DOCUMENTS

CN 101376456 3/2009
CN 101620443 A 1/2010
(Continued)

OTHER PUBLICATIONS

Decision to Grant of Japanese Patent application 2019-516688 issued by the JPO dated Nov. 4, 2020, 3 pages.
(Continued)

Primary Examiner — Thomas G Black
Assistant Examiner — Sara J Lewandroski
(74) Attorney, Agent, or Firm — Meunier Carlin & Curfman LLC

(57) ABSTRACT

The present application provides a method, apparatus and system for controlling transportation between warehouses. The method includes: receiving, from the source RCS, first transportation information which includes information of a first to-be-transported object; transporting the first to-be-transported object to a handover area; transferring control over the AGV from the source RCS to the target RCS; receiving a location of a first target storage space from the target RCS; transporting the first to-be-transported object from the handover area to the first target storage space. In the present application, the AGV transfers the control over itself
(Continued)

from the source RCS to the target RCS after moving the to-be-transported object to the handover area, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

16 Claims, 15 Drawing Sheets

(51) Int. Cl.
| | |
|---|---|
| *G06Q 50/28* | (2012.01) |
| *G05B 19/418* | (2006.01) |
| *G05D 1/00* | (2006.01) |
| *G01C 21/20* | (2006.01) |
| *G06Q 10/08* | (2012.01) |

(52) U.S. Cl.
CPC .......... *G05D 1/0027* (2013.01); *G06F 16/29* (2019.01); *G06Q 50/28* (2013.01); *G05B 2219/31002* (2013.01); *G05B 2219/31086* (2013.01); *G05B 2219/31216* (2013.01); *G05B 2219/39147* (2013.01); *G05D 2201/0216* (2013.01); *G06Q 10/087* (2013.01); *Y02P 90/02* (2015.11); *Y02P 90/60* (2015.11)

(56) References Cited

U.S. PATENT DOCUMENTS

| | | | | |
|---|---|---|---|---|
| 5,187,664 | A * | 2/1993 | Yardley | G05D 1/0265 180/167 |
| 5,303,154 | A * | 4/1994 | Luke, Jr. | G05D 1/0265 340/438 |
| 9,582,001 | B1 * | 2/2017 | Holmberg | B62D 63/04 |
| 2008/0071404 | A1 | 3/2008 | Park | |
| 2014/0303768 | A1 | 9/2014 | Klumpp et al. | |
| 2016/0129592 | A1 * | 5/2016 | Saboo | G05D 1/0297 700/248 |
| 2016/0176638 | A1 * | 6/2016 | Toebes | B65G 1/0492 700/216 |
| 2016/0229631 | A1 | 11/2016 | Kimura et al. | |
| 2019/0196491 | A1 * | 6/2019 | Balogh | G05D 1/0214 |

FOREIGN PATENT DOCUMENTS

| | | |
|---|---|---|
| CN | 103587869 | 2/2014 |
| CN | 104182860 A | 12/2014 |
| CN | 104537514 A | 4/2015 |
| CN | 204549862 | 8/2015 |
| CN | 105858045 A | 8/2016 |
| JP | 2007200190 A * | 8/2007 |
| JP | 2007200190 A | 8/2007 |
| JP | 2010143665 A | 7/2010 |
| WO | 2016125001 A1 | 11/2016 |

OTHER PUBLICATIONS

Extended European Search Report received in connection with European Application No. 17854588 5, dated Sep. 25, 2019, 10 pages.
International Search Report (English) dated and Written Opinion dated Oct. 26, 2017, from International Application No. PCT/CN2017/096813, 9 pages.
Notice of Reasons for Refusal of Japanese Patent Application 2019-516688, issued by the JPO dated May 26, 2020, 5 pages.

* cited by examiner

```
┌─────────────────────────────────────────────┐
│ Receiving, from the source RCS, first        │   S101
│ transportation information which includes    │
│ information of a first to-be-transported     │
│ object                                       │
└─────────────────────────────────────────────┘
                     │
                     ▼
┌─────────────────────────────────────────────┐
│ Transporting the first to-be-transported    │   S102
│ object to a handover area                    │
└─────────────────────────────────────────────┘
                     │
                     ▼
┌─────────────────────────────────────────────┐
│ Transferring a control over the AGV from    │   S103
│ the source RCS to the target RCS and         │
│ receiving a location of a first target       │
│ storage space from the target RCS            │
└─────────────────────────────────────────────┘
                     │
                     ▼
┌─────────────────────────────────────────────┐
│ Transporting the first to-be-transported    │   S104
│ object from the handover area to the first  │
│ target storage space                         │
└─────────────────────────────────────────────┘
```

Fig. 1

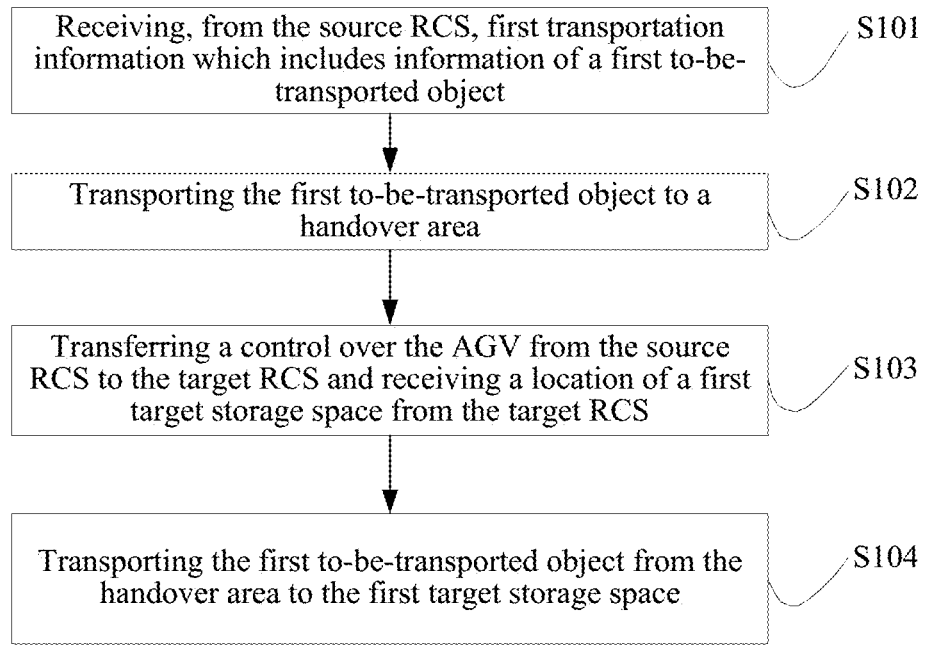

Fig. 2

CROSS-STORAGE TRANSPORTATION CONTROL METHOD, APPARATUS AND SYSTEM

The present application is a national stage application filed under 35 U.S.C. § 371 of PCT/CN2017/096813, filed Aug. 10, 2017, which claims the priority to a Chinese patent application No. 201610854227.1 filed with the China National Intellectual Property Administration on Sep. 27, 2016 and entitled "Trans-warehouse Transport Control Method, Device and System", each of which are incorporated herein by reference in their entirety.

TECHNICAL FIELD

The present application relates to the field of automatic logistics, and in particular to a method, device and system for controlling transportation between warehouses.

BACKGROUND

Currently, the process for transporting goods between warehouses in related art is as follows. A source RCS (Robot Cooperative System) controls AGVs (Automated Guided Vehicles) in a factory building to move objects to a handover area between a source factory building and a target factory building. The objects are then moved to a target storage space in the target factory building by workers. In such process, there are a plurality of AGVs in the source factory building, which are controlled by the source RCS.

Since the objects are moved by the workers from the handover area to the target storage space, the transportation is not fully automated, resulting in a low efficiency for transporting goods from one warehouse to another.

SUMMARY

The objective of the embodiments of the present application is to provide a method, device and system for controlling transportation between warehouses, to improve the efficiency of transporting and warehousing. Specifically, the technical solutions are as follows.

A method for controlling transportation between warehouses is provided, which is applicable to an automated guided vehicle AGV in a system for controlling transportation between warehouses. The system for controlling transportation between warehouses further includes a source RCS and a target RCS. The method may include:

receiving, from the source RCS, first transportation information which includes information of a first to-be-transported object;

transporting the first to-be-transported object to a handover area;

transferring a control over the AGV from the source RCS to the target RCS and receiving a location of a first target storage space from the target RCS; and transporting the first to-be-transported object from the handover area to the first target storage space.

Optionally, the process of transferring the control over the AGV from the source RCS to the target RCS includes:

sending a suspension request to the source RCS;

sending a takeover request to the target RCS; and receiving a message of successful takeover from the target RCS.

Optionally, before sending the takeover request to the target RCS, the method further includes:

receiving a first address from the source RCS; and wherein sending the takeover request to the target RCS, includes:

sending the takeover request to a target RCS corresponding to the first address.

Optionally, before receiving the location of the first target storage space from the target RCS, the method further includes:

sending, to the target RCS, a first request for obtaining a location of a target storage space.

Optionally, after transporting the first to-be-transported object from the handover area to the first target storage space, the method further includes:

sending a message of successful transportation to the target RCS;

receiving, from the target RCS, second transportation information which includes information of a second to-be-transported object;

transporting the second to-be-transported object to the handover area;

transferring a control over the AGV from the target RCS to the source RCS and receiving a location of a second target storage space from the source RCS; and transporting the second to-be-transported object from the handover area to the second target storage space.

Optionally, after transporting the second to-be-transported object from the handover area to the second target storage space, the method further includes:

sending a message of successful transportation to the source RCS.

Optionally, after transporting the first to-be-transported object from the handover area to the first target storage space, the method further includes:

sending a message of successful transportation to the target RCS;

receiving return information from the target RCS;

moving to the handover area;

transferring a control over the AGV from the target RCS to the source RCS and receiving a target location from the source RCS; and moving to the target location.

Optionally, after moving to the target location, the method further includes:

sending a message of successful return to the source RCS.

Optionally, the process of transferring the control over the AGV from the target RCS to the source RCS includes:

sending a suspension request to the target RCS;

sending a takeover request to the source RCS; and receiving a message of successful takeover from the source RCS.

Optionally, before sending the takeover request to the source RCS, the method further includes:

receiving a second address from the target RCS; and wherein sending the takeover request to the source RCS, includes:

sending the takeover request to a source RCS corresponding to the second address.

An apparatus for controlling transportation between warehouses is provided, which is applicable to an automated guided vehicle AGV in a system for controlling transportation between warehouses. The system for controlling transportation between warehouses further includes a source RCS and a target RCS. The apparatus may include:

a first receiving module, configured for receiving, from the source RCS, first transportation information which includes information of a first to-be-transported object;

a first transporting module, configured for transporting the first to-be-transported object to a handover area;

a first transferring module, configured for transferring a control over the AGV from the source RCS to the target RCS and receiving a location of a first target storage space from the target RCS; and a second transporting module, configured for transporting the first to-be-transported object from the handover area to the first target storage space.

Optionally, the first transferring module includes:

a first suspension request sending unit, configured for sending a suspension request to the source RCS;

a first takeover request sending unit, configured for sending a takeover request to the target RCS; and a first receiving unit, configured for receiving a message of successful takeover from the target RCS and a location of a first target storage space.

Optionally, the apparatus for controlling transportation between warehouses according to the present application further includes:

a second receiving module, configured for receiving a first address from the source RCS before sending the takeover request to the target RCS.

The first takeover request sending unit is specifically configured for:

sending the takeover request to a target RCS corresponding to the first address.

Optionally, the apparatus for controlling transportation between warehouses according to the present application further includes:

a first request sending module, configured for sending, to the target RCS, a first request for obtaining a location of a target storage space before receiving the location of the first target storage space from the target RCS.

Optionally, the apparatus for controlling transportation between warehouses according to the present application further includes:

a first sending module, configured for sending a message of successful transportation to the target RCS after transporting the first to-be-transported object from the handover area to the first target storage space;

a third receiving module, configured for receiving, from the target RCS, second transportation information which includes information of a second to-be-transported object;

a third transporting module, configured for transporting the second to-be-transported object to the handover area;

a second transferring module, configured for transferring a control over the AGV from the target RCS to the source RCS and receiving a location of a second target storage space from the source RCS; and a fourth transporting module, configured for transporting the second to-be-transported object from the handover area to the second target storage space.

Optionally, the apparatus for controlling transportation between warehouses according to the present application further includes:

a second sending module, configured for sending a message of successful transportation to the source RCS after transporting the second to-be-transported object from the handover area to the second target storage space.

Optionally, the apparatus for controlling transportation between warehouses according to the present application further includes:

a third sending module, configured for sending a message of successful transportation to the target RCS after transporting the first to-be-transported object from the handover area to the first target storage space;

a fourth receiving module, configured for receiving return information from the target RCS;

a first moving module, configured for moving to the handover area;

a third transferring module, configured for transferring a control over the AGV from the target RCS to the source RCS and receiving a target location from the source RCS; and a second moving module, configured for moving to the target location.

Optionally, the apparatus for controlling transportation between warehouses according to the present application further includes:

a fourth sending module, configured for sending a message of successful return to the source RCS after moving to the target location.

Optionally, the third transferring module includes:

a second suspension request sending unit, configured for sending a suspension request to the target RCS;

a second takeover request sending unit, configured for sending a takeover request to the source RCS; and a second receiving unit, configured for receiving a message of successful takeover from the source RCS.

Optionally, the apparatus for controlling transportation between warehouses according to the present application further includes:

a fifth receiving module, configured for receiving a second address from the target RCS before sending the takeover request to the source RCS.

The second takeover request sending unit is specifically configured for:

sending the takeover request to a source RCS corresponding to the second address.

To achieve the above objective, an embodiment of the present application also provides an automated guided vehicle, which includes: a vehicle body, wheels, a controller, and a memory. The wheels are rotatably attached to the vehicle body. The controller and the memory are connected to each other and are disposed in the vehicle body. The memory is used for storing a computer program. The controller is used for executing the program stored on the memory to perform the following steps:

receiving, from the source RCS, first transportation information which includes information of a first to-be-transported object;

transporting the first to-be-transported object to a handover area;

transferring a control over the AGV from the source RCS to the target RCS and receiving a location of a first target storage space from the target RCS; and transporting the first to-be-transported object from the handover area to the first target storage space.

Optionally, the process of transferring the control over the AGV from the source RCS to the target RCS includes:

sending a suspension request to the source RCS;

sending a takeover request to the target RCS; and receiving a message of successful takeover from the target RCS.

Optionally, before sending the takeover request to the target RCS, the method further includes:

receiving a first address from the source RCS; and wherein sending the takeover request to the target RCS, includes:

sending the takeover request to a target RCS corresponding to the first address.

Optionally, before receiving the location of the first target storage space from the target RCS, the method further includes:

sending, to the target RCS, a first request for obtaining a location of a target storage space.

Optionally, after transporting the first to-be-transported object from the handover area to the first target storage space, the method further includes:

sending a message of successful transportation to the target RCS;

receiving, from the target RCS, second transportation information which includes information of a second to-be-transported object;

transporting the second to-be-transported object to the handover area;

transferring a control over the AGV from the target RCS to the source RCS and receiving a location of a second target storage space from the source RCS; and transporting the second to-be-transported object from the handover area to the second target storage space.

Optionally, after transporting the second to-be-transported object from the handover area to the second target storage space, the method further includes:

sending a message of successful transportation to the source RCS.

Optionally, after transporting the first to-be-transported object from the handover area to the first target storage space, the method further includes:

sending a message of successful transportation to the target RCS;

receiving return information from the target RCS;

moving to the handover area;

transferring a control over the AGV from the target RCS to the source RCS and receiving a target location from the source RCS; and moving to the target location.

Optionally, after moving to the target location, the method further includes:

sending a message of successful return to the source RCS.

Optionally, the process of transferring the control over the AGV from the target RCS to the source RCS includes:

sending a suspension request to the target RCS;

sending a takeover request to the source RCS; and receiving a message of successful takeover from the source RCS.

Optionally, before sending the takeover request to the source RCS, the method further includes:

receiving a second address from the target RCS; and wherein sending the takeover request to the source RCS, includes:

sending the takeover request to a source RCS corresponding to the second address.

To achieve the above objective, an embodiment of the present application provides a computer readable storage medium. The storage medium stores a computer program that, when executed by a controller, implements the following steps:

receiving, from the source RCS, first transportation information which includes information of a first to-be-transported object;

transporting the first to-be-transported object to a handover area;

transferring a control over the AGV from the source RCS to the target RCS and receiving a location of a first target storage space from the target RCS; and transporting the first to-be-transported object from the handover area to the first target storage space.

Optionally, the process of transferring the control over the AGV from the source RCS to the target RCS includes:

sending a suspension request to the source RCS;

sending a takeover request to the target RCS; and receiving a message of successful takeover from the target RCS.

Optionally, before sending the takeover request to the target RCS, the method further includes:

receiving a first address from the source RCS; and wherein sending the takeover request to the target RCS, includes:

sending the takeover request to a target RCS corresponding to the first address.

Optionally, before receiving the location of the first target storage space from the target RCS, the method further includes:

sending, to the target RCS, a first request for obtaining a location of a target storage space.

Optionally, after transporting the first to-be-transported object from the handover area to the first target storage space, the method further includes:

sending a message of successful transportation to the target RCS;

receiving, from the target RCS, second transportation information which includes information of a second to-be-transported object;

transporting the second to-be-transported object to the handover area;

transferring a control over the AGV from the target RCS to the source RCS and receiving a location of a second target storage space from the source RCS; and transporting the second to-be-transported object from the handover area to the second target storage space.

Optionally, after transporting the second to-be-transported object from the handover area to the second target storage space, the method further includes:

sending a message of successful transportation to the source RCS.

Optionally, after transporting the first to-be-transported object from the handover area to the first target storage space, the method further includes:

sending a message of successful transportation to the target RCS;

receiving return information from the target RCS;

moving to the handover area;

transferring a control over the AGV from the target RCS to the source RCS and receiving a target location from the source RCS; and moving to the target location.

Optionally, after moving to the target location, the method further includes:

sending a message of successful return to the source RCS.

Optionally, the process of transferring the control over the AGV from the target RCS to the source RCS includes:

sending a suspension request to the target RCS;

sending a takeover request to the source RCS; and receiving a message of successful takeover from the source RCS.

Optionally, before sending the takeover request to the source RCS, the method further includes:

receiving a second address from the target RCS; and wherein sending the takeover request to the source RCS, includes:

sending the takeover request to a source RCS corresponding to the second address.

A method for controlling transportation between warehouses is provided, which is applicable to a source RCS in a system for controlling transportation between warehouses. The system for controlling transportation between warehouses may further include an automated guided vehicle AGV and a target RCS. The method includes:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

Optionally, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

Optionally, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

An apparatus for controlling transportation between warehouses is provided, which is applicable to a source RCS in a system for controlling transportation between warehouses. The system for controlling transportation between warehouses may further include an automated guided vehicle AGV and a target RCS. The apparatus includes:

a fifth sending module, configured for sending, to the AGV, first transportation information including information of a first to-be-transported object, such that the AGV transports the first to-be-transported object to a handover area and sends a first transferring request to the source RCS; and a fifth transporting module, configured for receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

Optionally, the apparatus for controlling transportation between warehouses according to the present application further includes:

a sixth receiving module, configured for receiving a third transferring request sent by the AGV and taking control over the AGV, after the AGV transports the first to-be-transported object from the handover area to the first target storage space, wherein before sending the third transferring request to the source RCS, the AGV receives, from the target RCS, second transportation information including information of a second to-be-transported object, transports the second object to the handover area, and sends a fourth transferring request to the target RCS; and a sixth sending module, configured for sending a location of a second target storage space to the AGV, such that the AGV transports the second to-be-transported object from the handover area to the second target storage space.

Optionally, the apparatus for controlling transportation between warehouses according to the present application further includes:

a seventh receiving module, configured for receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and a seventh sending module, configured for sending a target location to the AGV, such that the AGV moves to the target location.

To achieve the above objective, an embodiment of the present application also provides an electronic device including a first processor and a first memory. The first memory is used for storing a computer program. The first processor is used for executing the program stored on the first memory to carry out a method for controlling transportation between warehouses, which is applicable to a source RCS. The method includes the following steps:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

Optionally, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

Optionally, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

To achieve the above objective, an embodiment of the present application provides a computer readable storage medium. The storage medium stores a computer program that, when executed by a processor, implements a method for controlling transportation between warehouses, which is applicable to a source RCS. The method includes the following steps:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

Optionally, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

Optionally, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

A method for controlling transportation between warehouses is provided, which is applicable to a target RCS in a system for controlling transportation between warehouses. The system for controlling transportation between warehouses may further include an automated guided vehicle AGV and a source RCS. The method includes:

receiving a second transferring request sent by the AGV and taking control over the AGV, wherein before sending the second transferring request to the target RCS, the AGV receives, from the source RCS, first transportation information including information of a first to-be-transported object, transports the first object to a handover area, and sends a first transferring request to the source RCS; and sending a location of a first target storage space to the AGV, such that the AGV transports the first to-be-transported object from the handover area to the first target storage space.

An apparatus for controlling transportation between warehouses is provided, which is applicable to a target RCS in a system for controlling transportation between warehouses. The system for controlling transportation between warehouses may further include an automated guided vehicle AGV and a source RCS. The apparatus includes:

an eighth receiving module, configured for receiving a second transferring request sent by the AGV and taking control over the AGV, wherein before sending the second transferring request to the target RCS, the AGV receives, from the source RCS, first transportation information including information of a first to-be-transported object, transports the first object to a handover area, and sends a first transferring request to the source RCS; and an eighth sending module, configured for sending a location of a first target storage space to the AGV, such that the AGV transports the first to-be-transported object from the handover area to the first target storage space.

To achieve the above objective, an embodiment of the present application also provides an electronic device including a second processor and a second memory. The second memory is used for storing a computer program. The second processor is used for executing the program stored on the second memory to carry out a method for controlling transportation between warehouses, which is applicable to a target RCS. The method includes the following steps:

receiving a second transferring request sent by the AGV and taking control over the AGV, wherein before sending the second transferring request to the target RCS, the AGV receives, from the source RCS, first transportation information including information of a first to-be-transported object, transports the first object to a handover area, and sends a first transferring request to the source RCS; and sending a location of a first target storage space to the AGV, such that the AGV transports the first to-be-transported object from the handover area to the first target storage space.

Optionally, the second processor is further provided for executing a program stored on the second memory to realize a method for controlling transportation between warehouses, which is applied to a source RCS. The method includes the following steps:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

Optionally, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

Optionally, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

To achieve the above objective, an embodiment of the present application provides a computer readable storage medium. The storage medium stores a computer program that, when executed by a processor, implements a method for controlling transportation between warehouses, which is applicable to a target RCS. The method includes the following steps:

receiving a second transferring request sent by the AGV and taking control over the AGV, wherein before sending the second transferring request to the target RCS, the AGV receives, from the source RCS, first transportation information including information of a first to-be-transported object, transports the first object to a handover area, and sends a first transferring request to the source RCS; and sending a location of a first target storage space to the AGV, such that the AGV transports the first to-be-transported object from the handover area to the first target storage space.

Optionally, the computer program, when executed by the processor, implements the following steps of the method for controlling transportation between warehouses, which is applicable to a target RCS:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

Optionally, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

Optionally, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

A system for controlling transportation between warehouses is provided, which includes: a source RCS, a target RCS, and an automated guided vehicle AGV.

The source RCS is configured for sending, to the AGV, first transportation information which includes information of a first to-be-transported object.

The AGV is configured for receiving the first transportation information from the source RCS, transporting the first to-be-transported object to a handover area, and sending a first transferring request to the source RCS.

The source RCS is further configured for receiving the first transferring request from the AGV and removing a control over the AGV.

The AGV is further configured for sending a second transferring request to the target RCS.

The target RCS is configured for receiving the second transferring request from the AGV and sending a location of a first target storage space to the AGV.

The AGV is further configured for receiving the location of the first target storage space from the target RCS and transporting the first to-be-transported object from the handover area to the first target storage space.

Optionally, the handover area is the overlap between an area under the control of the source RCS and an area under the control of the target RCS.

Optionally, the source RCS is further configured for sending a first address to the AGV after removing the control over the AGV.

The AGV is specifically configured for receiving the first address from the source RCS and sending a second transferring request to a target RCS corresponding to the first address.

Optionally, the AGV is further configured for sending, to the target RCS, a first request for obtaining a location of a target storage space before receiving the location of the first target storage space from the target RCS.

Optionally, the AGV is further configured for sending a message of successful transportation to the target RCS after transporting the first to-be-transported object from the handover area to the first target storage space.

The target RCS is further configured for receiving the message of successful transportation from the AGV and sending second transportation information to the AGV, wherein the second transportation information includes information of a second to-be-transported object.

The AGV is further configured for receiving the second transportation information from the target RCS, transporting the second to-be-transported object to the handover area, and sending a fourth transferring request to the target RCS.

The target RCS is further configured for receiving the fourth transferring request from the AGV and removing the control over the AGV.

The AGV is further configured for sending a third transferring request to the source RCS.

The source RCS is further configured for receiving the third transferring request from the AGV, taking control over the AGV, and sending a location of a second target storage space to the AGV.

The AGV is further configured for receiving the location of the second target storage space from the source RCS and transporting the second to-be-transported object to the second target storage space.

Optionally, the AGV is further configured for sending a message of successful transportation to the source RCS after transporting the second to-be-transported object from the handover area to the second target storage space.

The source RCS is further configured for receiving the message of successful transportation from the AGV.

Optionally, the AGV is further configured for sending a message of successful transportation to the target RCS after transporting the first to-be-transported object from the handover area to the first target storage space.

The target RCS is further configured for receiving the message of successful transportation from the AGV and sending return information to the AGV.

The AGV is further configured for receiving the return information from the target RCS, moving to the handover area, and sending a sixth transferring request to the target RCS.

The target RCS is further configured for receiving the sixth transferring request from the AGV and removing the control over the AGV.

The AGV is further configured for sending a fifth transferring request to the source RCS.

The source RCS is further configured for receiving the fifth transferring request from the AGV, taking control over the AGV, and sending a target location to the AGV.

The AGV is further configured for receiving the target location from the source RCS and moving to the target location.

Optionally, the target RCS is further configured for sending a second address to the AGV after removing the control over the AGV.

The AGV is specifically configured for receiving the second address from the target RCS and sending a fifth transferring request to a source RCS corresponding to the second address.

Optional, the AGV is further configured for sending a message of successful return to the source RCS after moving to the target location; and The source RCS is further configured for receiving the message of successful return from the AGV.

In the present application, the AGV transfers the control over itself from the source RCS to the target RCS after moving the to-be-transported object to the handover area, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

BRIEF DESCRIPTION OF THE DRAWINGS

In order to illustrate the technical solutions of the embodiments of the present application and related technologies more clearly, the drawings used in the embodiments and related art are briefly described in the following. Obviously, the drawings described below are only for some embodiments of the present application, and those skilled in the art can obtain other drawings according to drawings herein without any creative efforts.

FIG. 1 is a first flowchart depicting a method for controlling transportation between warehouses according to an embodiment of the present application;

FIG. 2 is a schematic diagram depicting an interface at a workbench at the end of a production line according to an embodiment of the present application;

DETAILED DESCRIPTION

Figure 3:
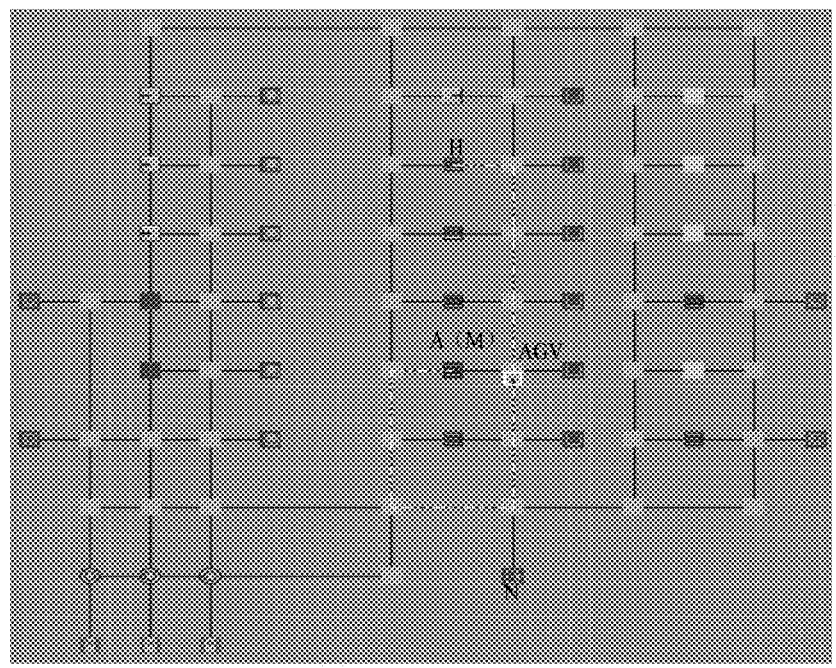
FIG. 3 is a schematic diagram depicting a source factory building according to an embodiment of the present application.

The technical solution of the application will be described in detail with reference to the drawings of embodiments of the present application. Obviously, the embodiments described are only some instead of all of the embodiments of the present application. All other embodiments obtained by those of ordinary skills in the art based on the embodiments herein without any creative efforts are within the scope of the present application.

To solve the problems in related art, embodiments of the present application provide a method, device and system for controlling transportation between warehouses.

A method and device for controlling transportation between warehouses according to embodiments of the present application are first explained below with respect to an automated guided vehicle AGV.

It should be noted that the method for controlling transportation between warehouses according to an embodiment of the present application is applicable to an automated guided vehicle AGV in a system for controlling transportation between warehouses. The system for controlling transportation between warehouses further includes a source RCS and a target RCS.

The AGV is a vehicle for transportation, which is equipped with an automatic guiding device such as electromagnetic or optical device, is capable of traveling along a prescribed guiding path, and provides safety protection functions and delivery functions.

There is a handover area between the source factory building and the target factory building. There are multiple AGVs in the source factory building and in the target factory building. A source RCS controls the AGVs in the source factory building, and a target RCS (Robot Cooperative System) controls the AGVs in the target factory building.

As shown in FIG. 1, the method for controlling transportation between warehouses according to the embodiment of the present application may include:

S101: receiving, from the source RCS, first transportation information which includes information of a first to-be-transported object.

The source RCS sends the first transportation information to an AGV when there is a to-be-transported object that needs to be transported to the target factory building.

The first transportation information includes information of the first to-be-transported object. The first to-be-transported object may be a finished product and a container, and the information of the first to-be-transported object may be the serial number of the finished product and the sequence number of the container. The first to-be-transported object may be a finished product only, and the information of the first to-be-transported object may be the serial number of the finished product. The first to-be-transported object may be the container only, and the information of the first to-be-transported object may be the sequence number of the container. The serial number of the finished product or the sequence number of the container can be obtained by scanning the finished product or the container at a workbench at the end of a production line. FIG. 2 shows the interface of the workbench at the end of the production line. Since the container can correspond to multiple storage spaces, the sequence numbers of the storage spaces and the serial numbers of the finished products are displayed in the interface.

S102: transporting the first to-be-transported object to a handover area.

After receiving the first transportation information from the source RCS, the AGV may transport the to-be-transported object indicated by the first transportation information from to the handover area. The to-be-transported object is generally located in the workbench at the end of the production line. The handover area is the junction of the source factory building and the target factory building.

In the present application, an AGV transports only one object at a time, and therefore will not transport a wrong object. After moving to the location of the to-be-transported object, the AGV can grasp the to-be-transported object and take it to the handover area.

In addition, when the to-be-transported object includes a finished product and a container, in order to ensure that there are always a container to hold a finished product at the workbench at the end of the production line, the source RCS can control other AGVs to transport empty containers to the workbench at the end of the production line after the to-be-transported object is transported away.

S103: transferring a control over the AGV from the source RCS to the target RCS and receiving a location of a first target storage space from the target RCS.

After the first to-be-transported object is transported to the handover area, the control over the AGV is transferred from the source RCS to the target RCS. At this time, the target RCS takes over the AGV, determines the location of the first target storage space, and sends the location of the first target storage space to the AGV. The AGV receives the location of the first target storage space sent by the target RCS.

S104: transporting the first to-be-transported object from the handover area to the first target storage space.

After the location of the first target storage space is received, the first to-be-transported object is transported from the handover area to the first target storage space to finish the transporting and warehousing.

In the present application, the AGV transfers the control over itself from the source RCS to the target RCS after moving the to-be-transported object to the handover area, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

For easy understanding, the method shown in FIG. 1 is described in detail below by way of a specific embodiment.

For example, the location of the AGV is denoted by H, the to-be-transported object is denoted by A, the location of the first to-be-transported object is denoted by M, the handover area is denoted by N, and the first target storage space is denoted by P.

In the source factory building as shown in FIG. 3, the AGV receives the first transportation information sent by the source RCS, and moves from the location H to the location M of the first to-be-transported object A.

Figure 4:
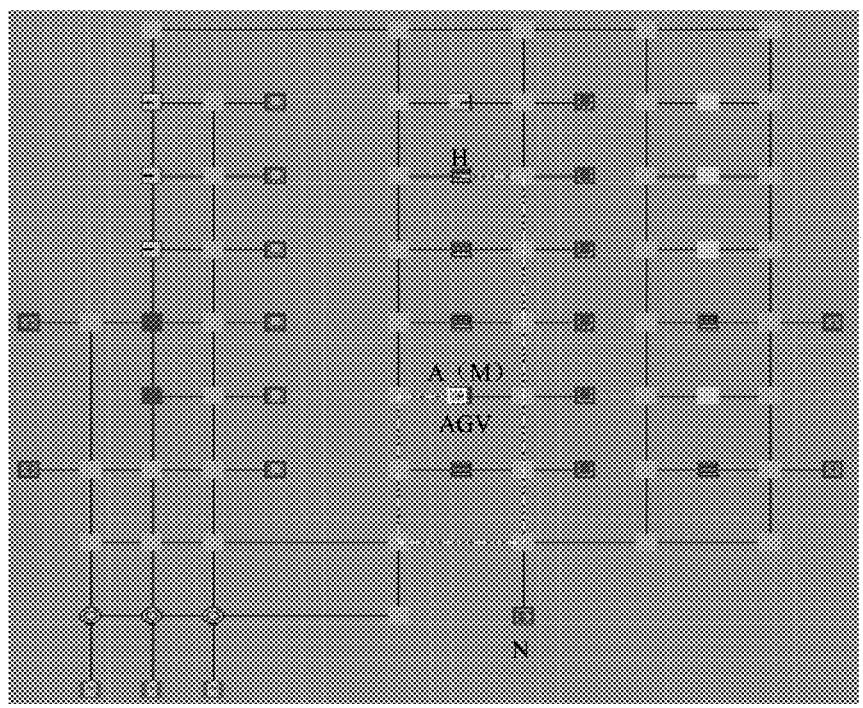
FIG. 4 is a schematic diagram depicting that an AGV moves to a location M of a to-be-transported object according to an embodiment of the present application.

As shown in FIG. 4, the AGV has moved to the location M of the first to-be-transported object A.

Figure 5:
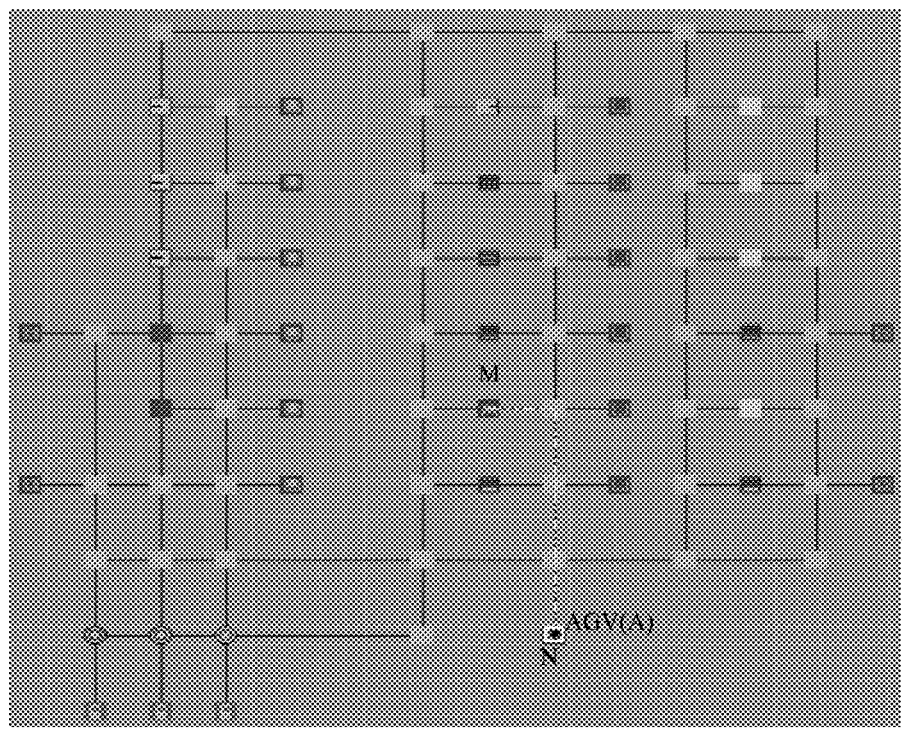
FIG. 5 is a schematic diagram depicting that the AGV transports the to-be-transported object A from the location M to a location N of the handover area according to an embodiment of the present application.

As shown in FIG. 5, the AGV transports the first to-be-transported object A from the location M to the location N of the handover area, and transfers the control over itself from the source RCS to the target RCS.

Figure 6:
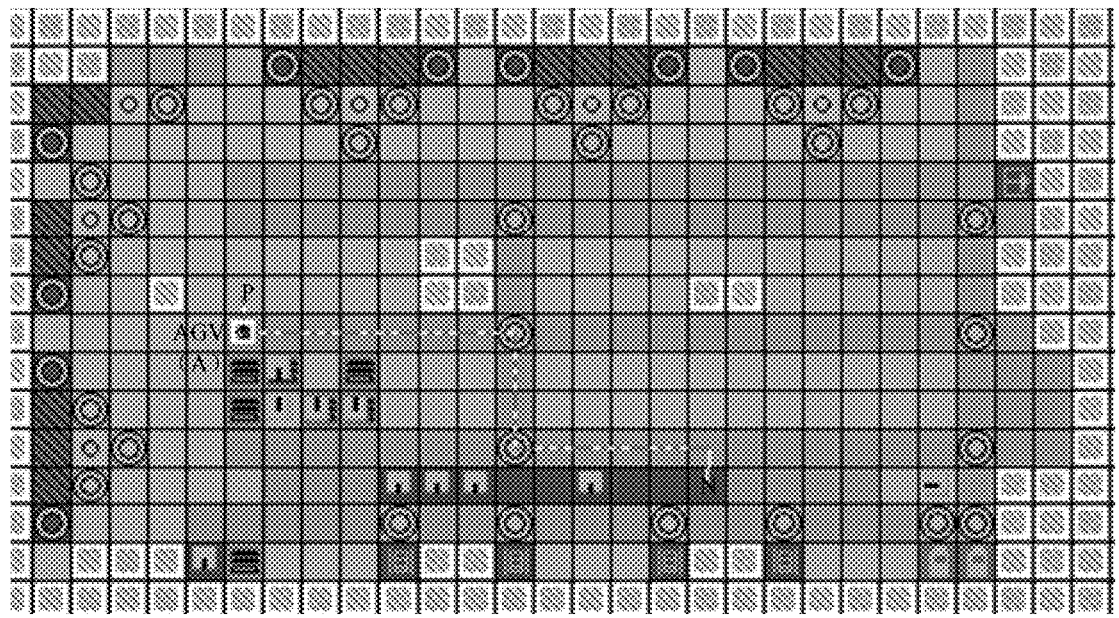
FIG. 6 is a schematic diagram depicting a target factory building according to an embodiment of the present application.

The AGV receives the location P of the first target storage space sent by the target RCS. In the target factory building as shown in FIG. 6, the AGV moves from the location N of the handover area to the location P of the first target storage space.

Figure 7:
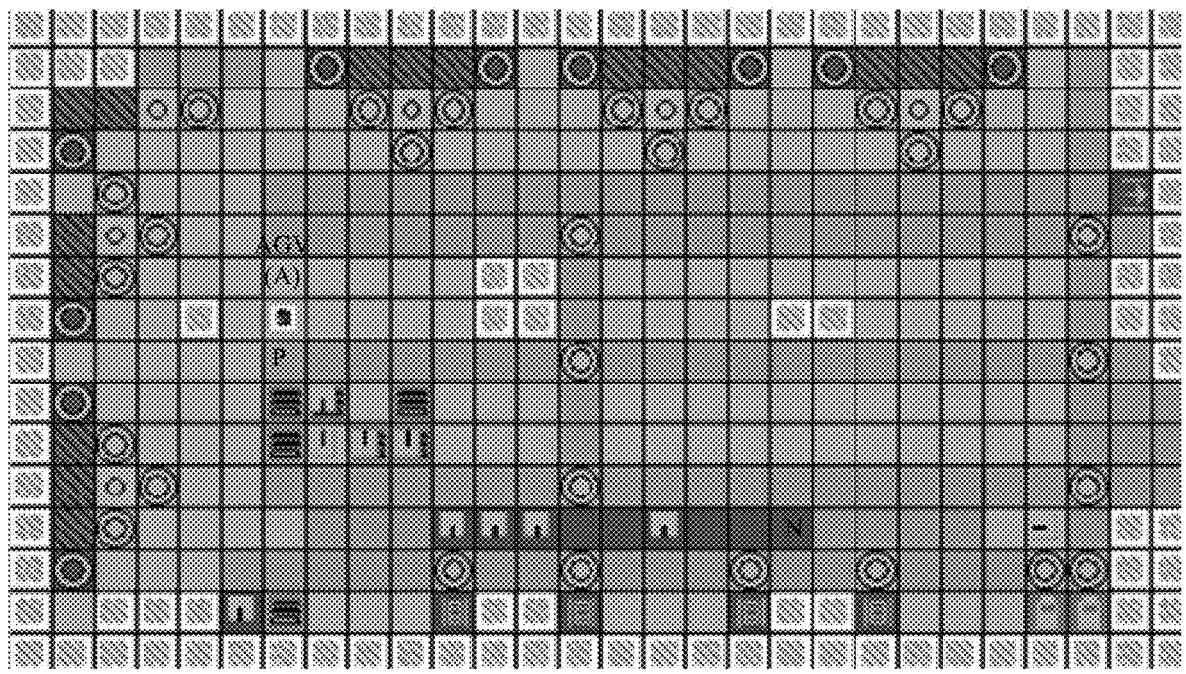
FIG. 7 is a schematic diagram depicting that the AGV transports the to-be-transported object A from the location N of the handover area to a location P of the first target storage space according to an embodiment of the present application.

As shown in FIG. 7, the AGV transports the first to-be-transported object A from the location N of the handover area to the first target storage space P.

Figure 8:
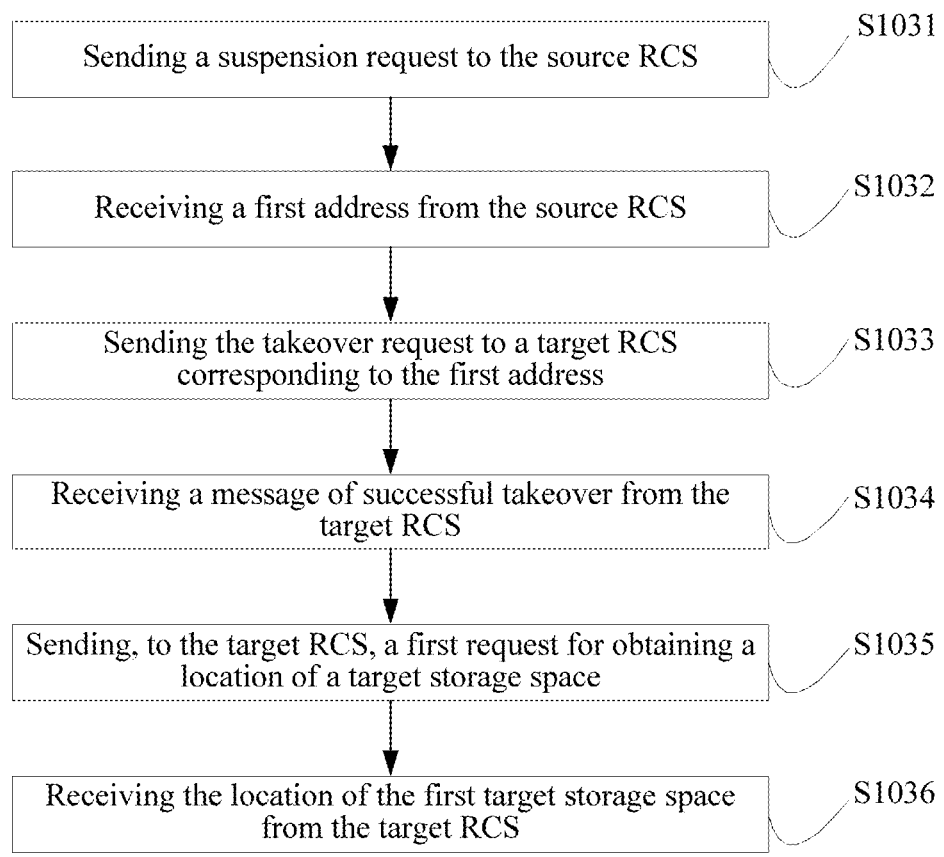
FIG. 8 is a flowchart depicting the transfer of a control according to an embodiment of the present application.

In an implementation of the present application, as shown in FIG. 8, the process of transferring a control over the AGV from the source RCS to the target RCS and receiving a location of a first target storage space from the target RCS (S103), may include:

S1031: sending a suspension request to the source RCS.

The AGV sends the suspension request to the source RCS, such that the source RCS removes the control over the AGV.

S1032: receiving a first address from the source RCS.

Since there may be a plurality of target factory buildings, the source RCS may send the address of a corresponding target RCS to the AGV after receiving the suspension request sent by the AGV. When there is only one target factory building, the AGV may directly send a takeover request to the target RCS.

S1033: sending the takeover request to a target RCS corresponding to the first address.

After receiving the first address, the AGV may send the takeover request to the target RCS corresponding to the first address, such that the target RCS corresponding to the first address starts to control the AGV.

S1034: receiving a message of successful takeover from the target RCS.

After receiving the successful takeover message sent by the target RCS, it can be determined that the control over the AGV has been transferred from the source RCS to the target RCS.

S1035: sending, to the target RCS, a first request for obtaining a location of a target storage space.

The AGV does not know the details of the storage spaces in the target factory building and where the first to-be-transported object needs to be transported to. Therefore, after receiving the message of successful takeover sent by the target RCS, the AGV may send a first request to the target RCS to obtain the location of the target storage space. Alternatively, the target RCS may directly determine the location of the first target storage space after taking over the AGV, and send the location of the first target storage space to the AGV. In this case, the AGV does not need to send the first request for obtaining a location of a target storage space.

S1036: receiving the location of the first target storage space from the target RCS.

Figure 9:
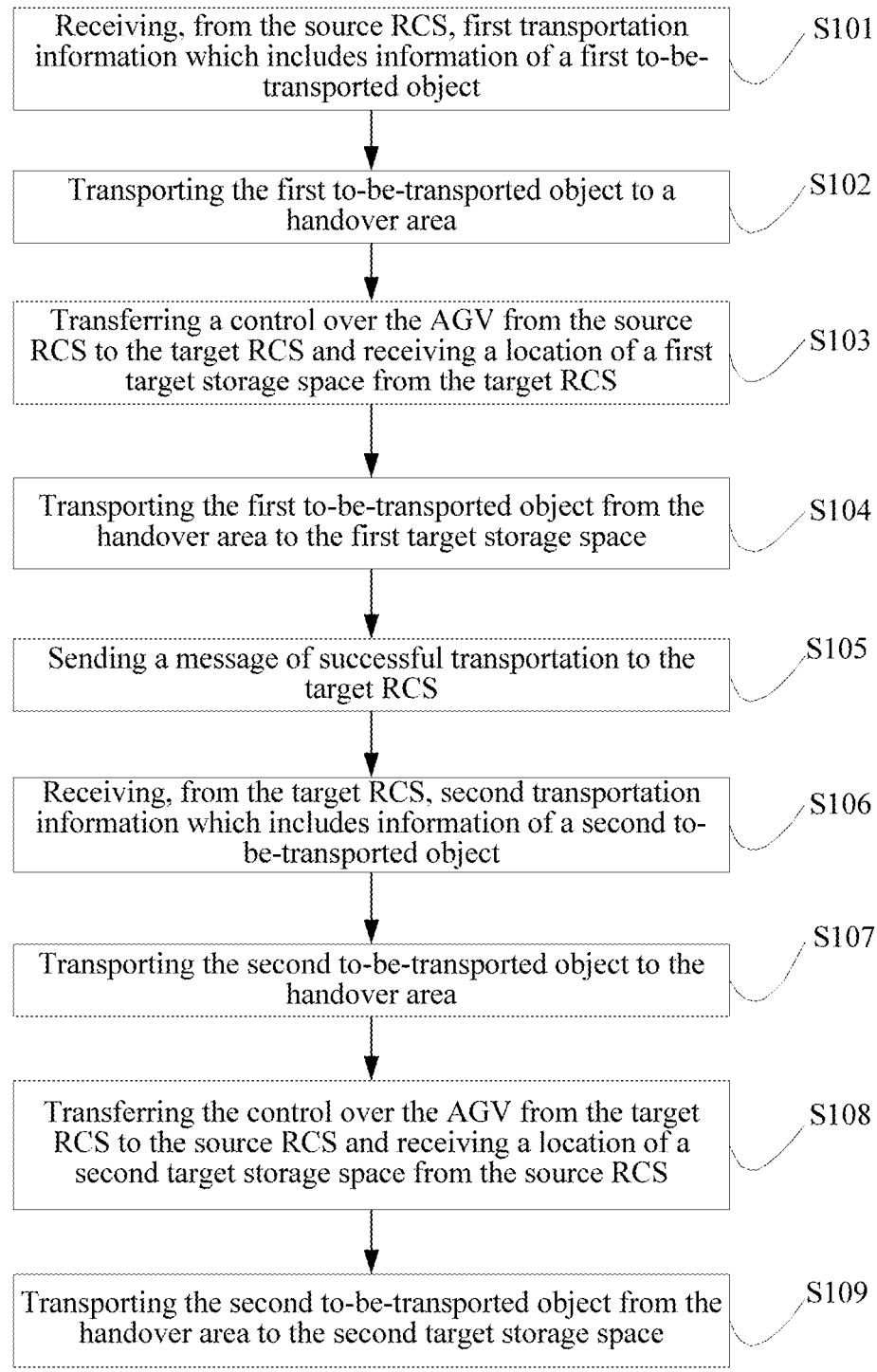
FIG. 9 is a second flowchart depicting a method for controlling transportation between warehouses according to an embodiment of the present application.

On the basis of the embodiment shown in FIG. 1, a method for controlling transportation between warehouses according to an embodiment of the present application, as shown in FIG. 9, may include:

S105: sending a message of successful transportation to the target RCS.

Step S105 may be performed after step S104.

The transporting and warehousing is done after the first to-be-transported object is transported from the handover area to the first target storage space. At this time, the message of successful transportation is sent to the target RCS, so that the target RCS learns the situation and therefore controls the AGV to perform other tasks.

S106: receiving, from the target RCS, second transportation information which includes information of a second to-be-transported object.

In order to improve the utilization of AGVs, before the AGV moves back to the source factory building, the target RCS detects whether there is any empty container in the target factory building. If there is an empty container, the target RCS sends the second transportation information to the AGV. The second transportation information includes the information of the second to-be-transported object, in this case, information of the empty container detected by the target RCS. The information of the empty container may be the sequence number of the empty container.

S107: transporting the second to-be-transported object to the handover area.

There are sometimes available empty containers in the target factory building. Therefore, after receiving the second transportation information sent by the target RCS, the AGV transports the second to-be-transported object to the handover area.

S108: transferring the control over the AGV from the target RCS to the source RCS and receiving a location of a second target storage space from the source RCS.

After the second to-be-transported object is transported to the handover area, the control over the AGV is transferred from the target RCS to the source RCS. At this time, the source RCS takes over the AGV, determines the location of the second target storage space, and sends the location of the second target storage space to the AGV. The AGV receives the location of the second target storage space sent by the source RCS.

In an implementation of the present application, the process of transferring a control over the AGV from the target RCS to the source RCS and receiving a location of a second target storage space from the source RCS, may include:

sending a suspension request to the target RCS, receiving a second address from the target RCS, sending a takeover request to a source RCS corresponding to the second address, receiving a message of successful takeover from the source RCS, sending to the source RCS a second request for obtaining a location of a target storage space, and receiving the location of the second target storage space from the source RCS.

It should be noted that the AGV sends the suspension request to the target RCS such that the target RCS removes the control over the AGV. Since there may be a plurality of source factory buildings, the target RCS may send a second address of a corresponding source RCS to the AGV after receiving the suspension request sent by the AGV. When there is only one source factory building, the AGV may directly send a takeover request to the source RCS. After receiving the second address, the AGV may send the takeover request to the source RCS corresponding to the second address, such that the source RCS corresponding to the second address takes over the AGV. After receiving the successful takeover message sent by the source RCS, it can be determined that the control over the AGV has been transferred from the target RCS to the source RCS.

The AGV does not know the details of the storage spaces in the source factory building and where the second to-be-transported object needs to be transported to. Therefore, after receiving the message of successful takeover sent by the source RCS, the AGV may send a second request to the source RCS to obtain the location of the second target storage space. Alternatively, the source RCS may directly determine the location of the second target storage space after taking over the AGV, and send the location of the second target storage space to the AGV. In this case, the AGV does not need to send the second request for obtaining a location of a target storage space. The AGV receives the location of the second target storage space from the source RCS.

S109: transporting the second to-be-transported object from the handover area to the second target storage space.

After the location of the second target storage space is received, the second to-be-transported object is transported from the handover area to the second target storage space. At this point, the transporting and warehousing is completed, and the warehouse herein is the source factory building.

In the present application, after transporting the to-be-transported object to the handover area, the AGV transfers the control over the AGV from the source RCS to the target RCS, such that the source RCS takes over the AGV and controls the AGV to transport the second to-be-transported object from the handover area to the second target storage space. In this way, the transportation is done fully automated, improving the efficiency of transporting and warehousing compared to the manual transporting. In addition, after the source RCS takes over the AGVs, the source RCS may control an AGV stayed at the second target storage location to leave, so that the AGV controlled by the source RCS does not occupy the second target storage space. Therefore, an AGV can place a second to-be-transported object to the second target storage space, improving the efficiency of transporting and warehousing.

Figure 10:
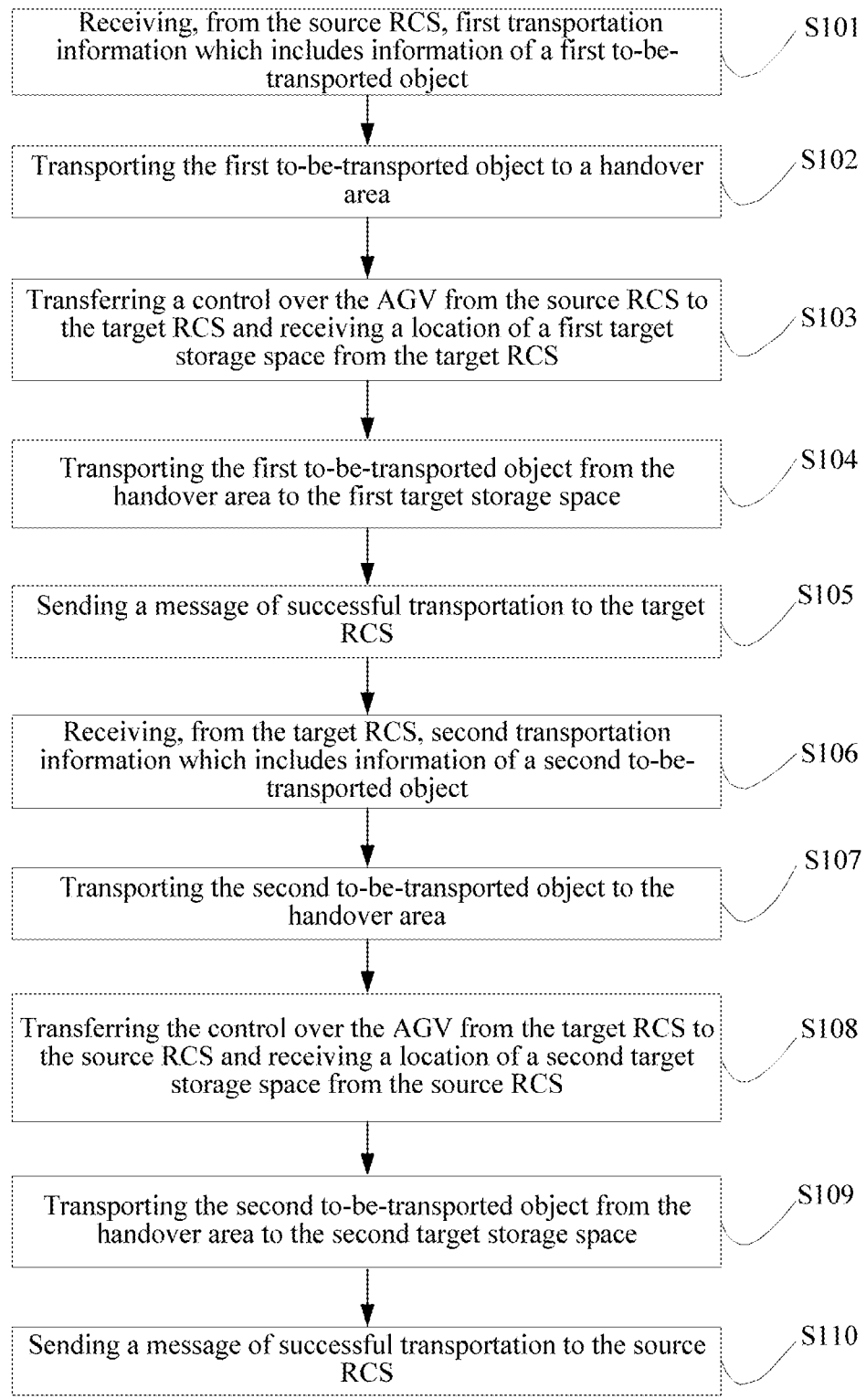
FIG. 10 is a third flowchart depicting a method for controlling transportation between warehouses according to an embodiment of the present application.

On the basis of the embodiment shown in FIG. 9, as shown in FIG. 10, the method for controlling transportation between warehouses according to the embodiment of the present application may include:

S110: sending a message of successful transportation to the source RCS.

Step S110 may be performed after step S109.

The transporting and warehousing is done after the second to-be-transported object is transported from the handover area to the location of the second target storage space. At this time, the message of successful transportation is sent to the source RCS, so that the source RCS learns the situation and therefore controls the AGV to perform other tasks.

Figure 11:
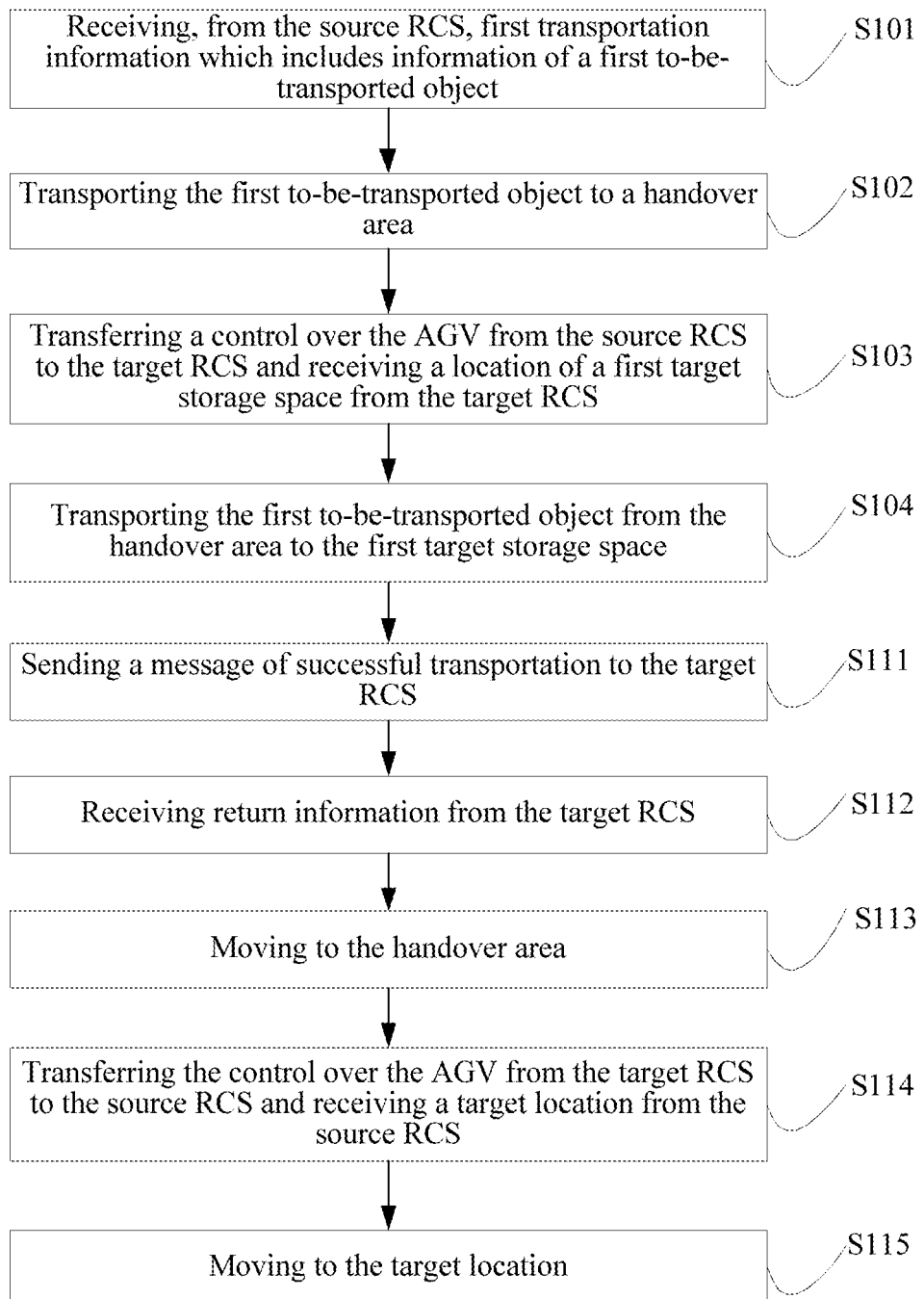
FIG. 11 is a fourth flowchart depicting a method for controlling transportation between warehouses according to an embodiment of the present application.

On the basis of the embodiment shown in FIG. 1, as shown in FIG. 11, the method for controlling transportation between warehouses according to the embodiment of the present application may include:

S111: sending a message of successful transportation to the target RCS.

Step S111 may be performed after step S104.

The transporting and warehousing is done after the first to-be-transported object is transported from the handover area to the first target storage space. At this time, the message of successful transportation is sent to the target RCS, so that the target RCS learns the situation and therefore controls the AGV to perform other tasks.

S112: receiving return information from the target RCS.

In order to improve the utilization of AGVs, before the AGV moves back to the source factory building, the target RCS detects whether there is any empty container in the target factory building. If there is no empty container in the target factory building, the target RCS sends the return information to the AGV, and the AGV receives the return information sent by the target RCS.

S113: moving to the handover area.

After receiving the return information from the target RCS, the AGV moves to the handover area.

S114: transferring the control over the AGV from the target RCS to the source RCS and receiving a target location from the source RCS.

The AGV transfers the control over the AGV from the target RCS to the source RCS. At this time, the source RCS takes over the AGV, determines the target location, and sends the determined target location to the AGV. The AGV receives the target location sent by the source RCS.

In an implementation of the present application, the process of transferring a control over the AGV from the target RCS to the source RCS and receiving a target location from the source RCS, may include:

sending a suspension request to the target RCS, receiving a second address from the target RCS, sending a takeover request to a source RCS corresponding to the second address, receiving a message of successful takeover from the source RCS, sending to the source RCS a third request for obtaining the target location, and receiving the target location from the source RCS.

It should be noted that the AGV sends the suspension request to the target RCS such that the target RCS removes the control over the AGV. Since there may be a plurality of source factory buildings, the target RCS may send a second address of a corresponding source RCS to the AGV after receiving the suspension request sent by the AGV. When there is only one source factory building, the AGV may directly send a takeover request to the source RCS. After receiving information of the second address, the AGV may send the takeover request to the source RCS corresponding to the second address, such that the source RCS corresponding to the second address takes over the AGV. After receiving the successful takeover message sent by the source RCS, it can be determined that the control over the AGV has been transferred from the target RCS to the source RCS.

The AGV does not know the details of the storage spaces in the source factory building and where to move to. Therefore, after receiving the message of successful takeover sent by the source RCS, the AGV may send a third request to the source RCS to obtain the target location. Alternatively, the source RCS may directly determine the target location after taking over the AGV, and send the target location to the AGV. In this case, the AGV does not need to send the third request for obtaining the target location. The AGV receives the target location from the source RCS.

S115: moving to the target location.

After receiving the target location sent by the source RCS, the AGV moves to the target location, thereby completing the return.

In the present application, after the AGV receives the return information from the target RCS and moves to the handover area, the AGV transfers the control over itself from the target RCS to the source RCS, such that the source RCS takes over the AGV and controls the AGV to move to the target location. Thus, an automatic return of the AGV is achieved.

Figure 12:
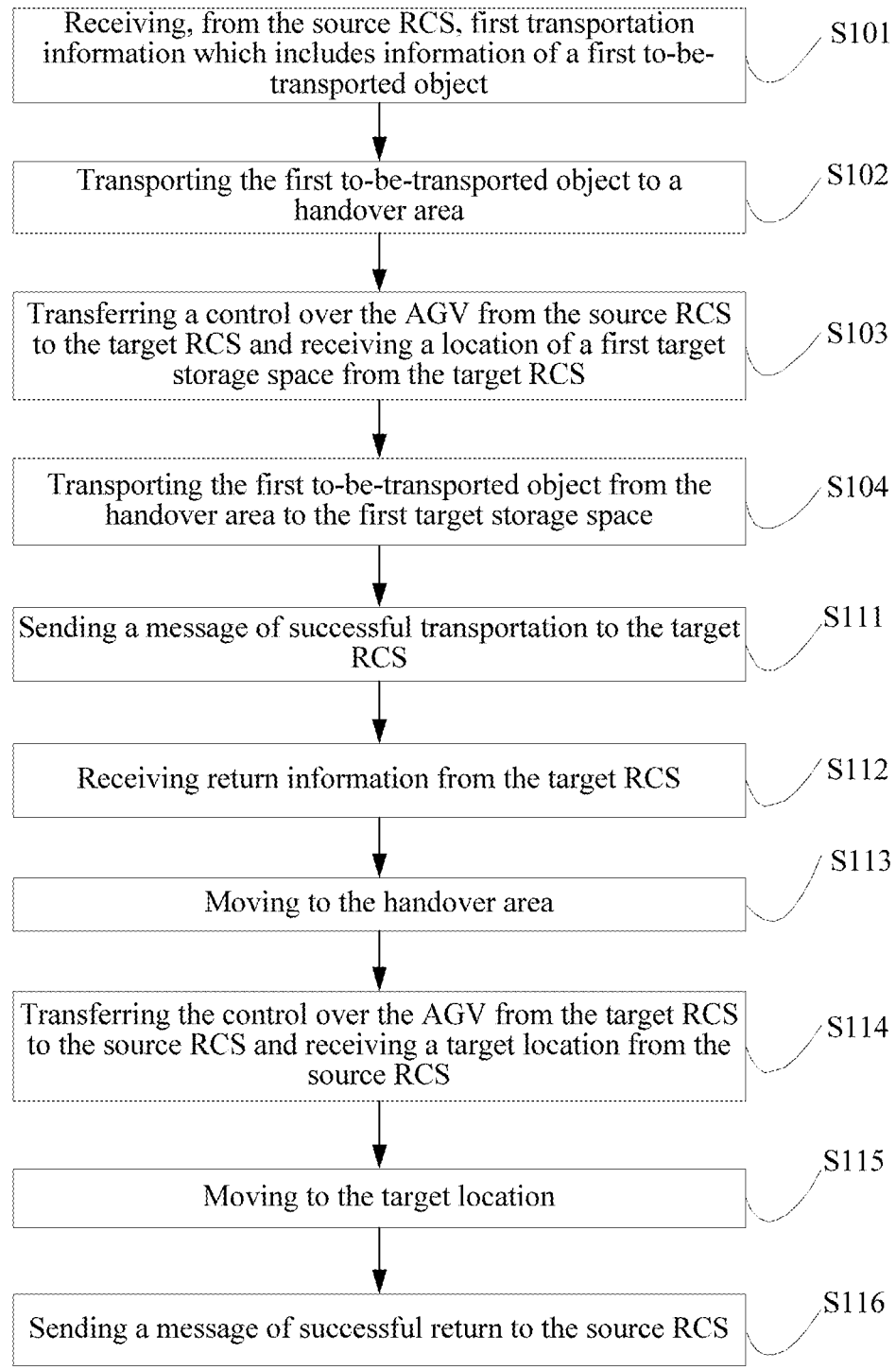
FIG. 12 is a fifth flowchart depicting a method for controlling transportation between warehouses according to an embodiment of the present application.

On the basis of the embodiment shown in FIG. 11, as shown in FIG. 12, after the process of moving to the target location, the method for controlling transportation between warehouses according to the embodiment of the present application may include:

S116: sending a message of successful return to the source RCS.

After moving to the target location, the return is finished. At this time, a message of successful return is sent to the source RCS, such that the source RCS learns the situation and controls the AGV to perform other tasks.

Figure 13:
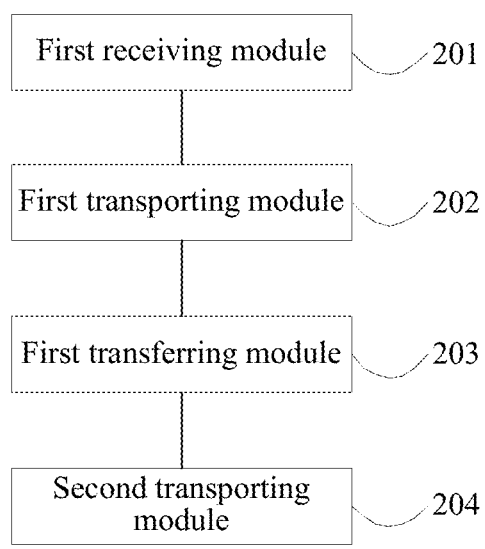
FIG. 13 is a schematic diagram depicting a first structure of a device for controlling transportation between warehouses according to an embodiment of the present application.

In relation to the above method embodiments, as shown in FIG. 13, an embodiment of the present application also provides an apparatus for controlling transportation between warehouses, which is applicable to an automated guided vehicle AGV in a system for controlling transportation between warehouses. The system for controlling transportation between warehouses further includes a source RCS and a target RCS. The apparatus may include:

a first receiving module 201, configured for receiving, from the source RCS, first transportation information which includes information of a first to-be-transported object;

a first transporting module 202, configured for transporting the first to-be-transported object to a handover area;

a first transferring module 203, configured for transferring a control over the AGV from the source RCS to the target RCS and receiving a location of a first target storage space from the target RCS; and a second transporting module 204, configured for transporting the first to-be-transported object from the handover area to the first target storage space.

In the present application, the AGV transfers the control over itself from the source RCS to the target RCS after moving the to-be-transported object to the handover area, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

Specifically, the first transferring module 203 may include:

a first suspension request sending unit, configured for sending a suspension request to the source RCS;

a first takeover request sending unit, configured for sending a takeover request to the target RCS; and a first receiving unit, configured for receiving a message of successful takeover from the target RCS and a location of a first target storage space.

The apparatus for controlling transportation between warehouses, which includes the first suspension request sending unit, the first takeover request sending unit, and the first receiving unit, may further include:

a second receiving module, configured for receiving a first address from the source RCS before sending the takeover request to the target RCS.

The first takeover request sending unit may be specifically used for:

sending the takeover request to a target RCS corresponding to the first address.

On the basis of the apparatus shown in FIG. 13, an apparatus for controlling transportation between warehouses according to an embodiment of the present application may include:

a first request sending module, configured for sending, to the target RCS, a first request for obtaining a location of a target storage space before receiving the location of the first target storage space from the target RCS.

Figure 14:
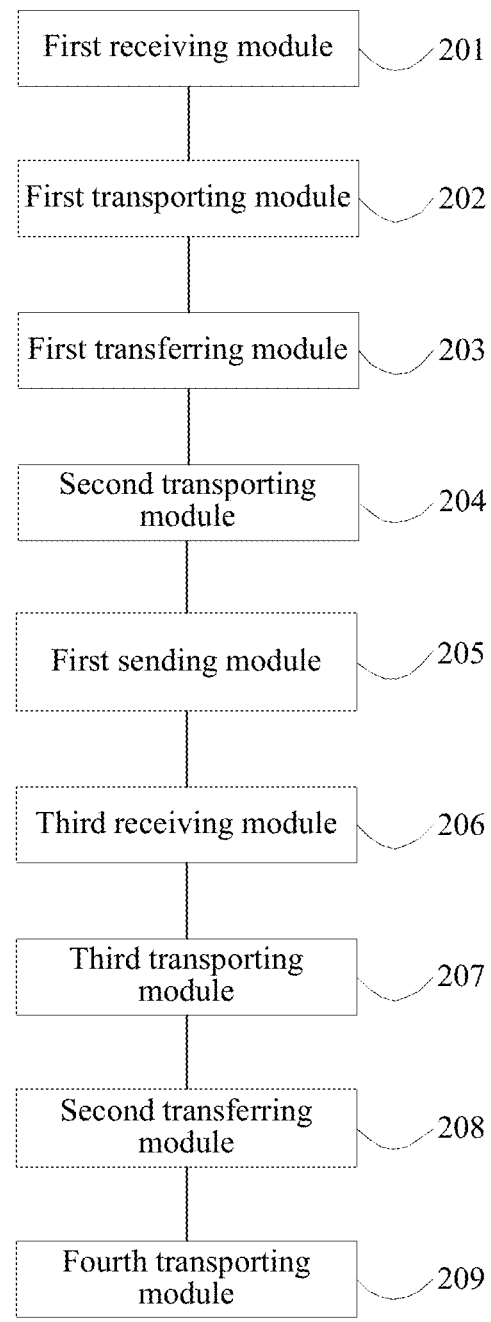
FIG. 14 is a schematic diagram depicting a second structure of a device for controlling transportation between warehouses according to an embodiment of the present application.

On the basis of the apparatus shown in FIG. 13, an apparatus for controlling transportation between warehouses according to an embodiment of the present application, as shown in FIG. 14, may include:

a first sending module 205, configured for sending a message of successful transportation to the target RCS after transporting the first to-be-transported object from the handover area to the first target storage space;

a third receiving module 206, configured for receiving, from the target RCS, second transportation information which includes information of a second to-be-transported object;

a third transporting module 207, configured for transporting the second to-be-transported object to the handover area;

a second transferring module 208, configured for transferring a control over the AGV from the target RCS to the source RCS and receiving a location of a second target storage space from the source RCS; and a fourth transporting module 209, configured for transporting the second to-be-transported object from the handover area to the second target storage space.

In the present application, after transporting the to-be-transported object to the handover area, the AGV transfers the control over the AGV from the source RCS to the target RCS, such that the source RCS takes over the AGV and controls the AGV to transport the second to-be-transported object from the handover area to the second target storage space. In this way, the transportation is done fully automated, improving the efficiency of transporting and warehousing compared to the manual transporting. In addition, after the source RCS takes over the AGVs, the source RCS may control an AGV stayed at the second target storage location to leave, so that the AGV controlled by the source RCS does not occupy the second target storage space. Therefore, an AGV can place a second to-be-transported object to the second target storage space, improving the efficiency of transporting and warehousing.

Figure 15:
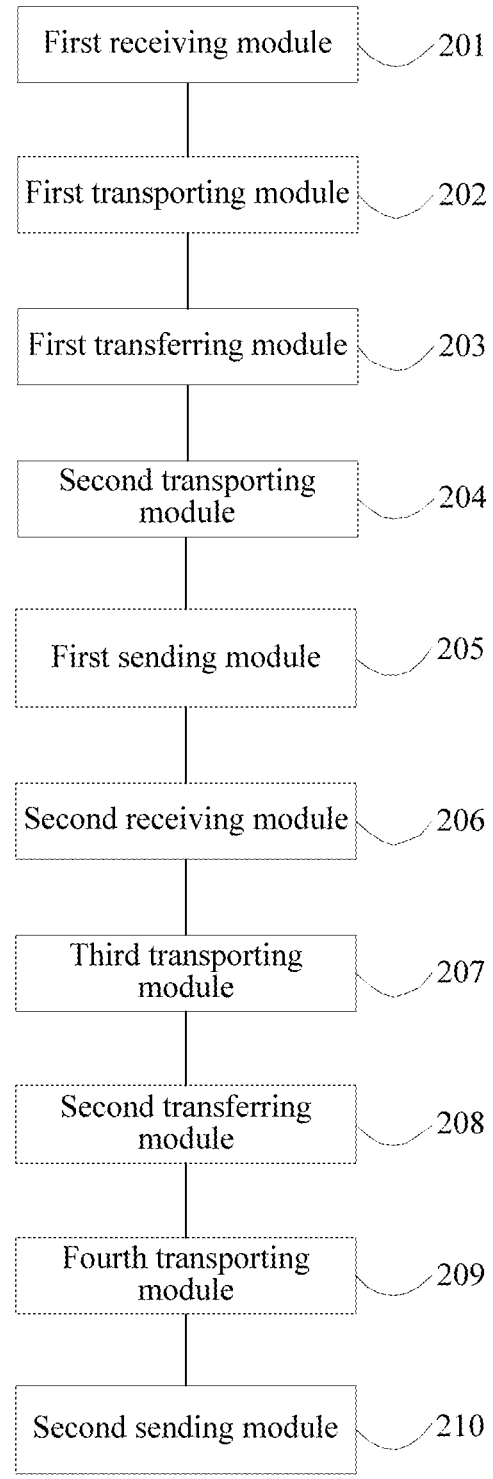
FIG. 15 is a schematic diagram depicting a third structure of a device for controlling transportation between warehouses according to an embodiment of the present application.

On the basis of the apparatus shown in FIG. 14, an apparatus for controlling transportation between warehouses according to an embodiment of the present application, as shown in FIG. 15, may include:

a second sending module 210, configured for sending a message of successful transportation to the source RCS after transporting the second to-be-transported object from the handover area to the second target storage space.

The transporting and warehousing is done after the second to-be-transported object is transported from the handover area to the location of the second target storage space. At this time, the message of successful transportation is sent to the source RCS, so that the source RCS learns the situation and therefore controls the AGV to perform other tasks.

On the basis of the apparatus shown in FIG. 13, an apparatus for controlling transportation between warehouses according to an embodiment of the present application may include:

a third sending module, configured for sending a message of successful transportation to the target RCS after transporting the first to-be-transported object from the handover area to the first target storage space;

a fourth receiving module, configured for receiving return information from the target RCS;

a first moving module, configured for moving to the handover area;

a third transferring module, configured for transferring a control over the AGV from the target RCS to the source RCS and receiving a target location from the source RCS; and a second moving module, configured for moving to the target location.

Specifically, the third transferring module may include:

a second suspension request sending unit, configured for sending a suspension request to the target RCS;

a second takeover request sending unit, configured for sending a takeover request to the source RCS; and a second receiving unit, configured for receiving a message of successful takeover from the source RCS.

The apparatus for controlling transportation between warehouses, which includes the second suspension request sending unit, the second takeover request sending unit, and the second receiving unit, may further include:

a fifth receiving module, configured for receiving a second address from the target RCS before sending the takeover request to the source RCS.

The second takeover request sending unit is specifically configured for:

sending the takeover request to a source RCS corresponding to the second address.

The device for controlling transportation between warehouses, which includes the third sending module, the third receiving module, the first moving module, the third transferring module, and the second moving module, may further include:

a fourth sending module, configured for sending a message of successful return to the source RCS after moving to the target location.

An embodiment of the present application also provides an automated guided vehicle, as shown in FIG. 12, which includes: a vehicle body 2101, wheels 2102, a controller 2103, and a memory 2104. The wheels 2102 are rotatably attached to the vehicle body 2101. The controller 2103 and the memory 2104 are connected to each other and are disposed in the vehicle body 2101. The memory 2104 is used for storing a computer program. The controller 2103 is used for executing the program stored on the memory to perform the method for controlling transportation between warehouses described, and the method includes:

receiving, from the source RCS, first transportation information which includes information of a first to-be-transported object;

transporting the first to-be-transported object to a handover area;

transferring a control over the AGV from the source RCS to the target RCS and receiving a location of a first target storage space from the target RCS; and transporting the first to-be-transported object from the handover area to the first target storage space.

In an implementation of the present application, the process of transferring the control over the AGV from the source RCS to the target RCS includes:

sending a suspension request to the source RCS;

sending a takeover request to the target RCS; and receiving a message of successful takeover from the target RCS.

In an implementation of the present application, before sending the takeover request to the target RCS, the method further includes:

receiving a first address from the source RCS; and wherein sending the takeover request to the target RCS, includes:

sending the takeover request to a target RCS corresponding to the first address.

In an implementation of the present application, before receiving the location of the first target storage space from the target RCS, the method further includes:

sending, to the target RCS, a first request for obtaining a location of a target storage space.

In an implementation of the present application, after transporting the first to-be-transported object from the handover area to the first target storage space, the method further includes:

sending a message of successful transportation to the target RCS;

receiving, from the target RCS, second transportation information which includes information of a second to-be-transported object;

transporting the second to-be-transported object to the handover area;

transferring a control over the AGV from the target RCS to the source RCS and receiving a location of a second target storage space from the source RCS; and transporting the second to-be-transported object from the handover area to the second target storage space.

In an implementation of the present application, after transporting the second to-be-transported object from the handover area to the second target storage space, the method further includes:

sending a message of successful transportation to the source RCS.

In an implementation of the present application, after transporting the first to-be-transported object from the handover area to the first target storage space, the method further includes:

sending a message of successful transportation to the target RCS;

receiving return information from the target RCS;

moving to the handover area;

transferring a control over the AGV from the target RCS to the source RCS and receiving a target location from the source RCS; and moving to the target location.

In an implementation of the present application, after moving to the target location, the method further includes:

sending a message of successful return to the source RCS.

In an implementation of the present application, the process of transferring the control over the AGV from the target RCS to the source RCS includes:

sending a suspension request to the target RCS;

sending a takeover request to the source RCS; and receiving a message of successful takeover from the source RCS.

In an implementation of the present application, before sending the takeover request to the source RCS, the method further includes:

receiving a second address from the target RCS; and wherein sending the takeover request to the source RCS, includes:

sending the takeover request to a source RCS corresponding to the second address.

In the present application, the AGV transfers the control over itself from the source RCS to the target RCS after moving the to-be-transported object to the handover area, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

An embodiment of the present application provides a computer readable storage medium. The storage medium stores a computer program that, when executed by a controller, implements the method for controlling transportation between warehouses described. The method includes:

receiving, from the source RCS, first transportation information which includes information of a first to-be-transported object;

transporting the first to-be-transported object to a handover area;

transferring a control over the AGV from the source RCS to the target RCS and receiving a location of a first target storage space from the target RCS; and transporting the first to-be-transported object from the handover area to the first target storage space.

In an implementation of the present application, the process of transferring the control over the AGV from the source RCS to the target RCS includes:

sending a suspension request to the source RCS;

sending a takeover request to the target RCS; and receiving a message of successful takeover from the target RCS.

In an implementation of the present application, before sending the takeover request to the target RCS, the method further includes:

receiving a first address from the source RCS; and wherein sending the takeover request to the target RCS, includes:

sending the takeover request to a target RCS corresponding to the first address.

In an implementation of the present application, before receiving the location of the first target storage space from the target RCS, the method further includes:

sending, to the target RCS, a first request for obtaining a location of a target storage space.

In an implementation of the present application, after transporting the first to-be-transported object from the handover area to the first target storage space, the method further includes:

sending a message of successful transportation to the target RCS;

receiving, from the target RCS, second transportation information which includes information of a second to-be-transported object;

transporting the second to-be-transported object to the handover area;

transferring a control over the AGV from the target RCS to the source RCS and receiving a location of a second target storage space from the source RCS; and transporting the second to-be-transported object from the handover area to the second target storage space.

In an implementation of the present application, after transporting the second to-be-transported object from the handover area to the second target storage space, the method further includes:

sending a message of successful transportation to the source RCS.

In an implementation of the present application, after transporting the first to-be-transported object from the handover area to the first target storage space, the method further includes:

sending a message of successful transportation to the target RCS;

receiving return information from the target RCS;

moving to the handover area;

transferring a control over the AGV from the target RCS to the source RCS and receiving a target location from the source RCS; and moving to the target location.

In an implementation of the present application, after moving to the target location, the method further includes:

sending a message of successful return to the source RCS.

In an implementation of the present application, the process of transferring the control over the AGV from the target RCS to the source RCS includes:

sending a suspension request to the target RCS;

sending a takeover request to the source RCS; and receiving a message of successful takeover from the source RCS.

In an implementation of the present application, before sending the takeover request to the source RCS, the method further includes:

receiving a second address from the target RCS; and wherein sending the takeover request to the source RCS, includes:

sending the takeover request to a source RCS corresponding to the second address.

In the present application, the AGV transfers the control over itself from the source RCS to the target RCS after moving the to-be-transported object to the handover area, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

A method and device for controlling transportation between warehouses according to embodiments of the present application are explained below with respect to a source RCS.

Figure 16:
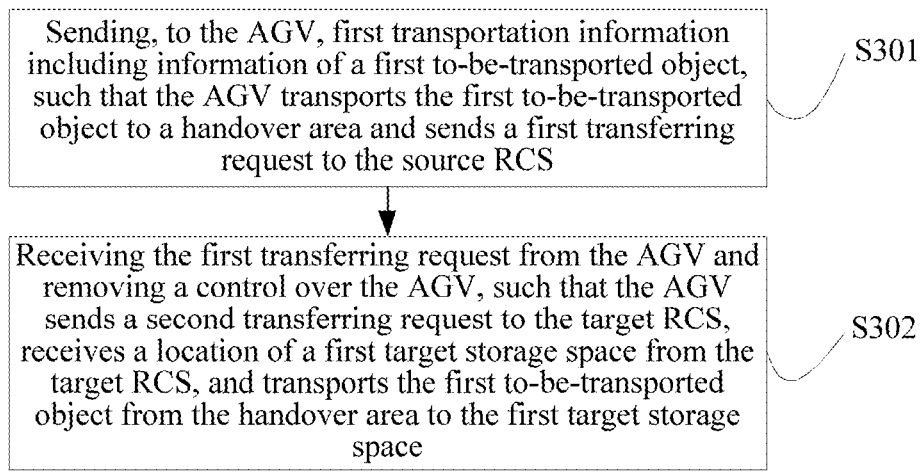
FIG. 16 is a sixth flowchart depicting a method for controlling transportation between warehouses according to an embodiment of the present application.

FIG. 16 illustrates a method for controlling transportation between warehouses, which is applicable to a source RCS in a system for controlling transportation between warehouses. The system for controlling transportation between warehouses may further include an automated guided vehicle AGV and a target RCS. The method may include:

S301: sending, to the AGV, first transportation information including information of a first to-be-transported object, such that the AGV transports the first to-be-transported object to a handover area and sends a first transferring request to the source RCS.

The source RCS sends the first transportation information to an AGV when there is a to-be-transported object that needs to be transported to the target factory building.

The first transportation information includes information of the first to-be-transported object. The first to-be-transported object may be a finished product and a container, and the information of the first to-be-transported object may be the serial number of the finished product and the sequence number of the container. The first to-be-transported object may be a finished product only, and the information of the first to-be-transported object may be the serial number of the finished product. The first to-be-transported object may be the container only, and the information of the first to-be-transported object may be the sequence number of the container. The serial number of the finished product or the sequence number of the container can be obtained by scanning the finished product or the container at a workbench at the end of a production line.

After receiving the first transportation information from the source RCS, the AGV may transport the to-be-transported object indicated by the first transportation information from to the handover area. The to-be-transported object is generally located in the workbench at the end of the production line. The handover area is the junction of the source factory building and the target factory building.

The AGV sends the first transferring request to the source RCS, after transporting the first to-be-transported object to the handover area.

S302: receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

After receiving the first transferring request from the AGV, the source RCS removes the control over the AGV, such that the AGV sends a second transferring request to the target RCS. After receiving the second transferring request, the target RCS takes over the AGV, determines the location of the first target storage space, and sends the location of the first target storage space to the AGV. The AGV receives the location of the first target storage space from the target RCS, and transports the first to-be-transported object from the handover area to the first target storage space. The transporting and warehousing is thus completed.

In the present application, after receiving the first transferring request from the AGV, the source RCS removes the control over the AGV, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

The embodiments with respect to the source RCS are substantially similar to the embodiments with respect to the AGV. The only difference is that they are described from different perspectives, thus the former are simply described. The relevant parts can be referred to the description of the embodiments with respect to the AGV.

On the basis of the method shown in FIG. 16, after the AGV transports the first to-be-transported object from the handover area to the first target storage space, the method for controlling the transportation between warehouses according to the present application may further include:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

The transporting and warehousing is done after the AGV transports the first to-be-transported object from the handover area to the first target storage space. At this time, the message of successful transportation is sent to the target RCS, so that the target RCS learns the situation and therefore controls the AGV to perform other tasks.

After the target has learned the situation, the target RCS detects whether there is any empty container in the target factory building. If there is an empty container, the target RCS sends the second transportation information to the AGV. The second transportation information includes the information of the second to-be-transported object, in this case, information of the empty container detected by the target RCS. The information of the empty container may be the sequence number of the empty container.

After receiving the second transportation information sent by the target RCS, the AGV transports the second to-be-transported object to the handover area, and sends the fourth transferring request to the target RCS, so that the target RCS removes the control over the AGV. The AGV sends a third transferring request to the source RCS. The source RCS receives the third transferring request sent by the AGV, controls the AGV, determines the location of the second target storage space, and sends the location of the second target storage space to the AGV, so that the AGV will transport the second to-be-transported object to the second target storage space.

In the present application, after receiving the third transferring request from the AGV, the source RCS controls the AGV and sends the location of the second target storage space to the AGV, such that the AGV transports the second to-be-transported object from the handover area to the second target storage space. In this way, a fully automatic transportation is achieved, improving the efficiency of transporting and warehousing compared to manual transporting.

On the basis of the method shown in FIG. 16, after the AGV transports the first to-be-transported object from the handover area to the first target storage space, the method for controlling the transportation between warehouses according to the present application may further include:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

The transporting and warehousing is done after the first to-be-transported object is transported from the handover area to the first target storage space. At this time, the AGV sends the message of successful transportation to the target RCS, so that the target RCS learns the situation and therefore controls the AGV to perform other tasks.

In order to improve the utilization of AGVs, before the AGV moves back to the source factory building, the target RCS detects whether there is any empty container in the target factory building. If there is no empty container in the target factory building, the target RCS sends the return information to the AGV. After receiving the return information from the target RCS, the AGV moves to the handover area and sends the sixth transferring request to the target RCS such that the target RCS removes the control over the AGV, and then the AGV sends the fifth transferring request to the source RCS. After receiving the fifth transferring request, the source RCS controls the AGV and determines the target location, sends the determined target location to the AGV, such that the AGV moves to the target location, completing the return.

In the present application, after receiving the fifth transferring request from the AGV, the source RCS controls the AGV and sends the target location to the AGV, such that the AGV moves to the target location, thereby achieving an automatic return of the AGV.

Figure 17:
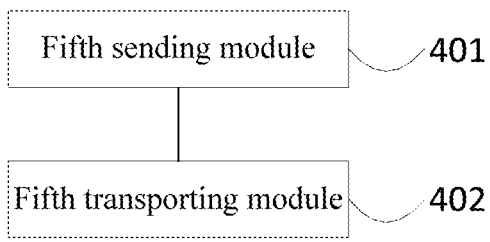
FIG. 17 is a schematic diagram depicting a fourth structure of a device for controlling transportation between warehouses according to an embodiment of the present application.

In relation to the above method embodiments, as shown in FIG. 17, an embodiment of the present application also provides an apparatus for controlling transportation between warehouses, which is applicable to a source RCS in a system for controlling transportation between warehouses. The system for controlling transportation between warehouses further includes an automated guided vehicle AGV and a target RCS. The apparatus may include:

a fifth sending module 401, configured for sending, to the AGV, first transportation information including information of a first to-be-transported object, such that the AGV transports the first to-be-transported object to a handover area and sends a first transferring request to the source RCS; and a fifth transporting module 402, configured for receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

In the present application, after receiving the first transferring request from the AGV, the source RCS removes the control over the AGV, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

On the basis of the apparatus shown in FIG. 17, an apparatus for controlling transportation between warehouses according to the present application may include:

a sixth receiving module, configured for receiving a third transferring request sent by the AGV and taking control over the AGV, after the AGV transports the first to-be-transported object from the handover area to the first target storage space, wherein before sending the third transferring request to the source RCS, the AGV receives, from the target RCS, second transportation information including information of a second to-be-transported object, transports the second object to the handover area, and sends a fourth transferring request to the target RCS; and a sixth sending module, configured for sending a location of a second target storage space to the AGV, such that the AGV transports the second to-be-transported object from the handover area to the second target storage space.

In the present application, after receiving the third transferring request from the AGV, the source RCS controls the AGV and sends the location of the second target storage space to the AGV, such that the AGV transports the second to-be-transported object from the handover area to the second target storage space. In this way, a fully automatic transportation is achieved, improving the efficiency of transporting and warehousing compared to manual transporting.

On the basis of the apparatus shown in FIG. 17, an apparatus for controlling transportation between warehouses according the present application may include:

a seventh receiving module, configured for receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and a seventh sending module, configured for sending a target location to the AGV, such that the AGV moves to the target location.

In the present application, after receiving the fifth transferring request from the AGV, the source RCS controls the AGV and sends the target location to the AGV, such that the AGV moves to the target location, thereby achieving an automatic return of the AGV.

Figure 22:
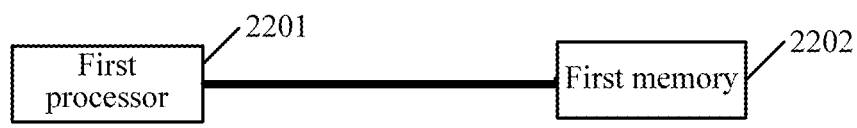
FIG. 22 is a schematic diagram depicting a first structure of an electronic device according to an embodiment of the present application.

An embodiment of the present application also provides an electronic device. As shown in FIG. 22, the electronic device includes a first processor 2201 and a first memory 2202. The first memory 2202 is used for storing a computer program. The first processor 2201 is used for executing the program stored on the first memory 2202 to carry out the above described method for controlling transportation between warehouses, which is applicable to a source RCS. The method includes:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

In an implementation of the present application, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

In an implementation of the present application, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

In the present application, after receiving the first transferring request from the AGV, the source RCS removes the control over the AGV, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

An embodiment of the present application provides a computer readable storage medium. The storage medium stores a computer program that, when executed by a processor, implements the method for controlling transportation between warehouses described above, which is applicable to source RCS. The method includes:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

In an implementation of the present application, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

In an implementation of the present application, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

In the present application, after receiving the first transferring request from the AGV, the source RCS removes the control over the AGV, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

A method and device for controlling transportation between warehouses according to embodiments of the present application are explained below with respect to a target RCS.

Figure 18:
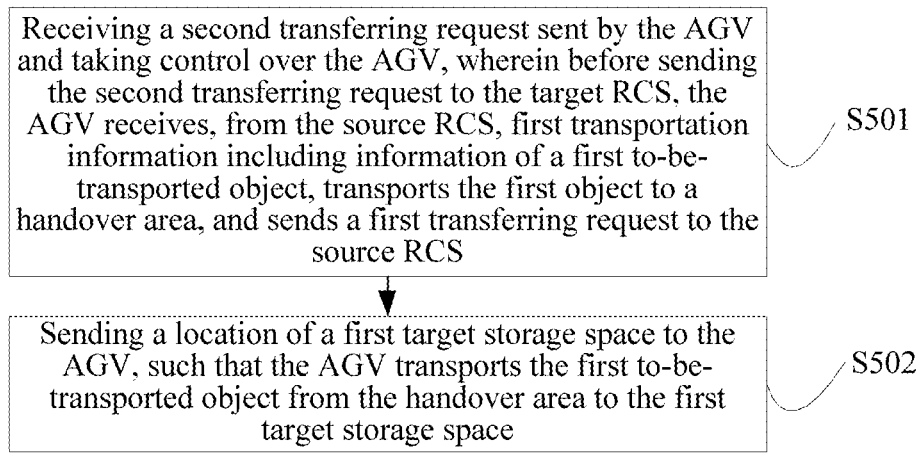
FIG. 18 is a seventh flowchart depicting a method for controlling transportation between warehouses according to an embodiment of the present application.

FIG. 18 illustrates a method for controlling transportation between warehouses, which is applicable to a target RCS in a system for controlling transportation between warehouses. The system for controlling transportation between warehouses may further include an automated guided vehicle AGV and a source RCS. The method may include:

S501: receiving a second transferring request sent by the AGV and taking control over the AGV, wherein before sending the second transferring request to the target RCS, the AGV receives, from the source RCS, first transportation information including information of a first to-be-transported object, transports the first object to a handover area, and sends a first transferring request to the source RCS.

The source RCS sends the first transportation information to an AGV when there is a to-be-transported object that needs to be transported to the target factory building.

The first transportation information includes information of the first to-be-transported object. The first to-be-transported object may be a finished product and a container, and the information of the first to-be-transported object may be the serial number of the finished product and the sequence number of the container. The first to-be-transported object may be a finished product only, and the information of the first to-be-transported object may be the serial number of the finished product. The first to-be-transported object may be the container only, and the information of the first to-be-transported object may be the sequence number of the container. The serial number of the finished product or the sequence number of the container can be obtained by scanning the finished product or the container at a workbench at the end of a production line.

After receiving the first transportation information from the source RCS, the AGV may transport the to-be-transported object indicated by the first transportation information from to the handover area. The to-be-transported object is generally located in the workbench at the end of the production line. The handover area is the junction of the source factory building and the target factory building.

After the AGV transports the first to-be-transported object to the handover area, the AGV sends the first transferring request to the source RCS. After receiving the first transferring request from the AGV, the source RCS removes the control over the AGV, such that the AGV sends the second transferring request to the target RCS. The target RCS controls the AGV after receiving the second transferring request.

S502: sending a location of a first target storage space to the AGV, such that the AGV transports the first to-be-transported object from the handover area to the first target storage space.

After receiving the second transferring request, the target RCS determines the location of the first target storage space, and sends the location of the first target storage space to the AGV. The AGV receives the location of the first target storage space from the target RCS, and transports the first to-be-transported object from the handover area to the first target storage space. The transporting and warehousing is thus completed.

In the present application, after receiving the second transferring request from the AGV, the source RCS controls the AGV, determines the location of the first target storage space, and sends the determined the location of the first target storage space to the AGV, such that the AGV transports the first to-be-transported object from the handover area to the first target storage space. In this way, a fully automatic transportation is achieved, improving the efficiency of transporting and warehousing compared to manual transporting.

Figure 19:
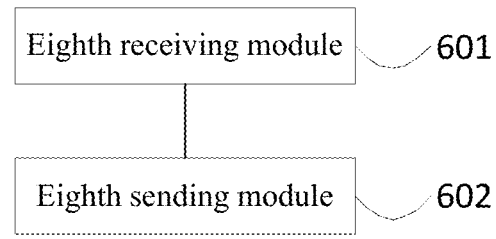
FIG. 19 is a schematic diagram depicting a fifth structure of a device for controlling transportation between warehouses according to an embodiment of the present application.

In relation to the above method embodiments, as shown in FIG. 19, an embodiment of the present application also provides an apparatus for controlling transportation between warehouses, which is applicable to a target RCS in a system for controlling transportation between warehouses. The system for controlling transportation between warehouses further includes an automated guided vehicle AGV and a source RCS. The apparatus may include:

an eighth receiving module 601, configured for receiving a second transferring request sent by the AGV and taking control over the AGV, wherein before sending the second transferring request to the target RCS, the AGV receives, from the source RCS, first transportation information including information of a first to-be-transported object, transports the first object to a handover area, and sends a first transferring request to the source RCS; and an eighth sending module 602, configured for sending a location of a first target storage space to the AGV, such that the AGV transports the first to-be-transported object from the handover area to the first target storage space.

In the present application, after receiving the second transferring request from the AGV, the source RCS controls the AGV, determines the location of the first target storage space, and sends the determined the location of the first target storage space to the AGV, such that the AGV transports the first to-be-transported object from the handover area to the first target storage space. In this way, a fully automatic transportation is achieved, improving the efficiency of transporting and warehousing compared to manual transporting.

The embodiments with respect to the target RCS are substantially similar to the embodiments with respect to the AGV. The only difference is that they are described from different perspectives, thus the former are simply described. The relevant parts can be referred to the description of the embodiments with respect to the AGV.

Figure 23:
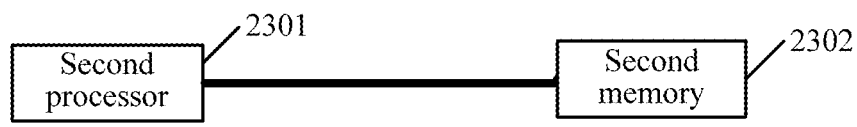
FIG. 23 is a schematic diagram depicting a second structure of an electronic device according to an embodiment of the present application.

An embodiment of the present application also provides an electronic device. As shown in FIG. 23, the electronic device includes a second processor 2301 and a second memory 2302. The second memory 2302 is used for storing a computer program. The second processor 2301 is used for executing the program stored on the second memory 2302 to carry out the above described method for controlling transportation between warehouses, which is applicable to a target RCS. The method includes:

receiving a second transferring request sent by the AGV and taking control over the AGV, wherein before sending the second transferring request to the target RCS, the AGV receives, from the source RCS, first transportation information including information of a first to-be-transported object, transports the first object to a handover area, and sends a first transferring request to the source RCS;

sending a location of a first target storage space to the AGV, such that the AGV transports the first to-be-transported object from the handover area to the first target storage space.

In the present application, after receiving the second transferring request from the AGV, the source RCS controls the AGV, determines the location of the first target storage space, and sends the determined the location of the first target storage space to the AGV, such that the AGV transports the first to-be-transported object from the handover area to the first target storage space. In this way, a fully automatic transportation is achieved, improving the efficiency of transporting and warehousing compared to manual transporting.

In addition, it should be noted that the second processor 2031 is further provided for executing a program stored on the second memory to realize a method for controlling transportation between warehouses, which is applied to a source RCS. The method includes the following steps:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

In an implementation of the present application, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

In an implementation of the present application, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

An embodiment of the present application provides a computer readable storage medium. The storage medium stores a computer program that, when executed by a processor, implements the method for controlling transportation between warehouses described above, which is applicable to target RCS. The method includes:

receiving a second transferring request sent by the AGV and taking control over the AGV, wherein before sending the second transferring request to the target RCS, the AGV receives, from the source RCS, first transportation information including information of a first to-be-transported object, transports the first object to a handover area, and sends a first transferring request to the source RCS;

sending a location of a first target storage space to the AGV, such that the AGV transports the first to-be-transported object from the handover area to the first target storage space.

In the present application, after receiving the second transferring request from the AGV, the source RCS controls the AGV, determines the location of the first target storage space, and sends the determined the location of the first target storage space to the AGV, such that the AGV transports the first to-be-transported object from the handover area to the first target storage space. In this way, a fully automatic transportation is achieved, improving the efficiency of transporting and warehousing compared to manual transporting.

In addition, it should be noted that the computer program, when executed by the processor, implements the following steps of the method for controlling transportation between warehouses, which is applicable to a target RCS:

sending, to the AGV, first transportation information including information of a first to-be-transported object, such that the AGV transports the first to-be-transported object to a handover area and sends a first transferring request to the source RCS; and receiving the first transferring request from the AGV and removing a control over the AGV, such that the AGV sends a second transferring request to the target RCS, receives a location of a first target storage space from the target RCS, and transports the first to-be-transported object from the handover area to the first target storage space.

In an implementation of the present application, after the AGV transports the first to-be-transported object from the handover area to the first target storage space, the method further includes:

receiving a third transferring request sent by the AGV and taking control over the AGV, wherein before sending the third transferring request to the source RCS, the AGV receives, from the target RCS, second transportation information including information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

In an implementation of the present application, after the AGV transports the first to-be-transported object from the handover area to the first target storage space, the method further includes:

receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and sending a target location to the AGV, such that the AGV moves to the target location.

Figure 20:
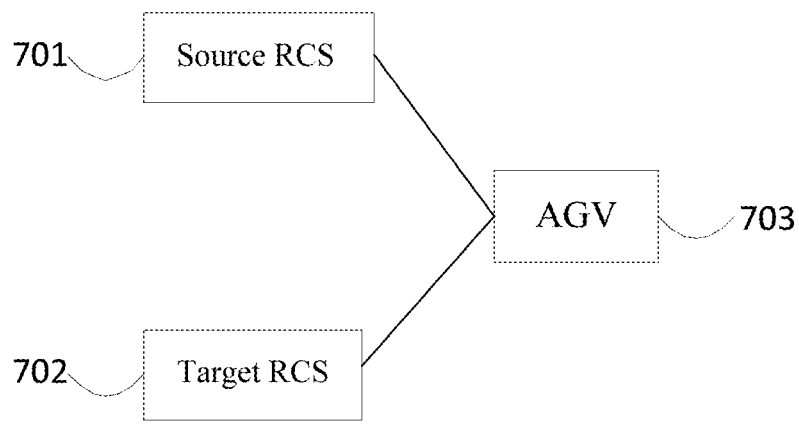
FIG. 20 is a schematic diagram depicting a structure of a system for controlling transportation between warehouses according to an embodiment of the present application.

Accordingly, as shown in FIG. 20, an embodiment of the present application also provides a system for controlling transportation between warehouses. The system may include: a source RCS 701, a target RCS 702 and an automated guided vehicle AGV 703.

The source RCS 701 sends to the AGV 703 first transportation information which includes information of a first to-be-transported object.

The AGV 703 receives first transportation information from the source RCS 701, transports the first to-be-transported object to the handover area, and sends a first transferring request to the source RCS 701.

The source RCS 701 receives the first transferring request from the AGV 703 and removes a control over the AGV 703.

The AGV 703 sends a second transferring request to the target RCS 702.

The target RCS 702 receives the second transferring request from the AGV 703 and sends a location of a first target storage space to the AGV 703.

The AGV 703 receives the location of the first target storage space from the target RCS 702 and transports the first to-be-transported object from the handover area to the first target storage space.

The process of transporting into a warehouse by the system for controlling transportation between warehouses described above includes:

1. The source RCS 701 sends to the AGV 703 first transportation information which includes information of a first to-be-transported object;

2. The AGV 703 receives the first transportation information from the source RCS 701, transports the first to-be-transported object to a handover area, and sends a first transferring request to the source RCS 701;

3. The source RCS 701 receives the first transferring request from the AGV 703 and removes the control over the AGV 703;

4. The AGV 703 sends a second transferring request to the target RCS 702;

5. The target RCS 702 receives the second transferring request from the AGV 703 and sends a location of a first target storage space to the AGV 703;

6. The AGV 703 receives the location of the first target storage space from the target RCS 702 and transports the first to-be-transported object from the handover area to the first target storage space.

In the present application, after moving the to-be-transported object to the handover area, the AGV sends the first transferring request to the source RCS and sends the second transferring request to the target RCS, such that the target RCS could take over the AGV and control the AGV to transport the first to-be-transported object from the handover area to the first target storage space. In this way, a fully automatic transportation is achieved, improving the efficiency of transporting and warehousing compared to manual transporting.

In an implementation of the present application, the handover area is the overlap between an area under the control of the source RCS 701 and an area under the control of the target RCS 702.

In order to realize the transfer of the control over the AGV 703, the handover area is determined as the overlap between an area under the control of the source RCS 701 and an area under the control of the target RCS 702. An AGV located in the handover area can be controlled by both the source RCS 701 and the target RCS 72.

In an implementation of the present application, the source RCS 701 sends a first address to the AGV 703 after removing the control over the AGV 703.

The AGV 703 receives the first address from the source RCS 701 and sends a second transferring request to a target RCS 702 corresponding to the first address.

In an implementation of the present application, the AGV 703 sends to the target RCS 702 a first request for obtaining a location of a target storage space before receiving the location of the first target storage space from the target RCS 702.

In an implementation of the present application, the AGV 703 sends a message of successful transportation to the target RCS 702 after transporting the first to-be-transported object from the handover area to the first target storage space.

The target RCS 702 receives the message of successful transportation from the AGV 703 and sends second transportation information to the AGV 703, wherein the second transportation information includes information of a second to-be-transported object.

The AGV 703 receives second transportation information from the target RCS 702, transports the second to-be-transported object to the handover area, and sends a fourth transferring request to the target RCS 702.

The target RCS 702 receives the fourth transferring request from the AGV 703 and removes the control over the AGV 703.

The AGV 703 sends a third transferring request to the source RCS 701.

The source RCS 701 receive the third transferring request from the AGV 703, controls the AGV 703, and sends a location of a second target storage space to the AGV 703.

The AGV 703 receives the location of the second target storage space from the source RCS 701 and transports the second to-be-transported object to the second target storage space.

In an implementation of the present application, the AGV 703 sends a message of successful transportation to the source RCS 701 after transporting the second to-be-transported object from the handover area to the second target storage space.

The source RCS 701 receives the message of successful transportation from the AGV 703.

In an implementation of the present application, the AGV 703 sends a message of successful transportation to the target RCS 702 after transporting the first to-be-transported object from the handover area to the first target storage space.

The target RCS 702 receives the message of successful transportation from the AGV 703 and sends return information to the AGV 703.

The AGV 703 receives the return information from the target RCS 702, moves to the handover area, and sends a sixth transferring request to the target RCS 702.

The target RCS 702 receives the sixth transferring request from the AGV 703 and removes the control over the AGV 703.

The AGV 703 sends a fifth transferring request to the source RCS 701.

The source RCS 701 receives the fifth transferring request from the AGV 703, controls the AGV 703, and sends a target location to the AGV 703.

The AGV 703 receives the target location from the source RCS 701 and moves to the target location.

In an implementation of the present application, the target RCS 702 sends a second address to the AGV 703 after removing the control over the AGV 703.

The AGV 703 receives the second address from the target RCS 702 and sends a fifth transferring request to a source RCS 701 corresponding to the second address.

In an implementation of the present application, the AGV 703 sends a message of successful return to the source RCS 701 after moving to the target location.

The source RCS 701 receives the message of successful return from the AGV 703.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

Figure 21:
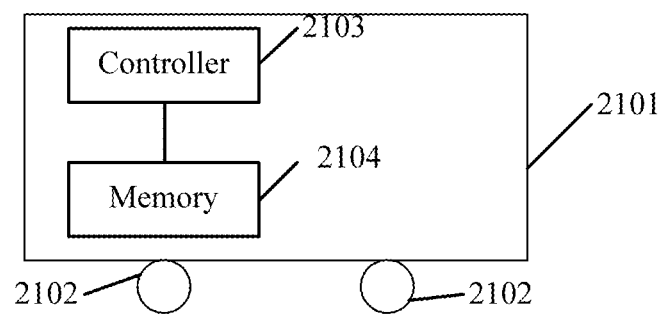
FIG. 21 is a schematic diagram depicting a structure of an automated guided vehicle according to an embodiment of the present application.

All the embodiments are described in corresponding ways, same or similar parts in each of the embodiments can be referred to one another, and the parts emphasized are differences to other embodiments. In particular, the embodiment of the apparatus for controlling transportation between warehouses illustrated in FIG. 13, the embodiment of the system for controlling transportation between warehouses illustrated in FIG. 20, the embodiment of the automated guided vehicle illustrated in FIG. 21, and the embodiment of the computer readable storage medium are substantially similar to the embodiment of the method for controlling transportation between warehouses shown in FIG. 1. Thus, the former are briefly described, and the relevant parts can be referred to the description of the embodiments of the method for controlling transportation between warehouses shown in FIG. 1.

The embodiment of the apparatus for controlling transportation between warehouses illustrated in FIG. 17, the embodiment of the electronic device illustrated in FIG. 22, and the embodiment of the computer readable storage medium are substantially similar to the embodiments of the method for controlling transportation between warehouses shown in FIG. 16. Thus, the former are briefly described, and the relevant parts can be referred to the description of the embodiments of the method for controlling transportation between warehouses shown in FIG. 16.

The embodiment of the apparatus for controlling transportation between warehouses illustrated in FIG. 19, the embodiment of the electronic device illustrated in FIG. 23, and the embodiment of the computer readable storage medium are substantially similar to the embodiments of the method for controlling transportation between warehouses shown in FIG. 18. Thus, the former are briefly described, and the relevant parts can be referred to the description of the embodiments of the method for controlling transportation between warehouses shown in FIG. 18.

The embodiments described above are merely preferred embodiments of the present application, and not intended to limit the scope of the present application. Any modifications, equivalents, improvements or the like within the spirit and principle of the application should be included in the scope of the application.

The invention claimed is:

1. A method for controlling transportation between warehouses, applicable to an Automated Guided Vehicle, AGV, in a system for controlling transportation between warehouses, the system further comprising a source Robot Cooperative System, RCS, and a target RCS, wherein the method comprises:

receiving, from the source RCS, first transportation information which comprises information of a first to-be-transported object;

transporting the first to-be-transported object to a handover area;

transferring a control over the AGV from the source RCS to the target RCS and receiving a location of a first target storage space from the target RCS, comprising:

sending a suspension request to the source RCS;

receiving a first address from the source RCS;

sending a takeover request to the target RCS corresponding to the first address; and receiving a message of successful takeover from the target RCS; and transporting the first to-be-transported object from the handover area to the first target storage space;

wherein the handover area is an overlap of an area under the control of the source RCS and an area under the control of the target RCS, and the AGV located in the handover area can be under the control of both the source RCS and the target RCS, wherein after transporting the first to-be-transported object from the handover area to the first target storage space, the method further comprises:

sending a message of successful transportation to the target RCS; receiving, from the target RCS, second transportation information which comprises information of a second to-be-transported object; transporting the second to-be-transported object to the handover area; transferring a control over the AGV from the target RCS to the source RCS and receiving a location of a second target storage space from the source RCS; and transporting the second to-be-transported object from the handover area to the second target storage space; or sending a message of successful transportation to the target RCS; receiving return information from the target RCS; moving to the handover area; transferring a control over the AGV from the target RCS to the source RCS and receiving a target location from the source RCS; and moving to the target location.

2. The method of claim 1, wherein transferring the control over the AGV from the target RCS to the source RCS, comprises:

sending a suspension request to the target RCS;

sending a takeover request to the source RCS; and receiving a message of successful takeover from the source RCS.

3. An automated guided vehicle, comprising a vehicle body, wheels, a controller, and a memory, wherein the wheels are rotatablely connected to the vehicle body; the controller and the memory are connected to each other and are disposed in the vehicle body; the memory is provided for storing a computer program; and the controller is provided for executing the program stored on the memory to carry out the steps of the method of claim 1.

4. The method of claim 1, wherein before receiving the location of the first target storage space from the target RCS, the method further comprises:

sending, to the target RCS, a first request for obtaining a location of a target storage space.

5. The method of claim 1, wherein transferring the control over the AGV from the target RCS to the source RCS, comprises:
sending a suspension request to the target RCS;
sending a takeover request to the source RCS; and
receiving a message of successful takeover from the source RCS.

6. The method of claim 5, wherein before sending the takeover request to the source RCS, the method further comprises:
receiving a second address from the target RCS; and
wherein sending the takeover request to the source RCS, comprises:
sending the takeover request to a source RCS corresponding to the second address.

7. The method of claim 1, wherein after transporting the second to-be-transported object from the handover area to the second target storage space, the method further comprises:
sending a message of successful transportation to the source RCS.

8. The method of claim 1, wherein after moving to the target location, the method further comprises:
sending a message of successful return to the source RCS.

9. A method for controlling transportation between warehouses, applicable to a source Robot Cooperative System, RCS, in a system for controlling transportation between warehouses, the system further comprising an Automated Guided Vehicle, AGV, and a target RCS, wherein the method comprises:
sending, to the AGV, first transportation information comprising information of a first to-be-transported object, such that the AGV transports the first to-be-transported object to a handover area and sends a first transferring request to the source RCS; and
receiving the first transferring request from the AGV and removing a control over the AGV, such that the AGV sends a second transferring request to the target RCS, receives a location of a first target storage space from the target RCS, and transports the first to-be-transported object from the handover area to the first target storage space;
wherein before sending a second transferring request to the target RCS, the AGV receives a first address from the source RCS, the second transferring request corresponding to the first address;
wherein the handover area is an overlap of an area under the control of the source RCS and an area under the control of the target RCS, and the AGV located in the handover area can be under the control of both the source RCS and the target RCS.

10. The method of claim 9, wherein after the AGV transports the first to-be-transported object from the handover area to the first target storage space, the method further comprises:
receiving a third transferring request sent by the AGV and taking control over the AGV, wherein before sending the third transferring request to the source RCS, the AGV receives, from the target RCS, second transportation information comprising information of a second to-be-transported object, transports the second object to the handover area, and sends a fourth transferring request to the target RCS; and sending a location of a second target storage space to the AGV, such that the AGV transports the second to-be-transported object from the handover area to the second target storage space.

11. The method of claim 9, wherein after the AGV transports the first to-be-transported object from the handover area to the first target storage space, the method further comprises:
receiving a fifth transferring request sent by the AGV and taking control over the AGV, wherein before sending the fifth transferring request to the source RCS, the AGV receives return information from the target RCS, moves to the handover area, and sends a sixth transferring request to the target RCS; and
sending a target location to the AGV, such that the AGV moves to the target location.

12. An electronic device, comprising a processor and a memory, wherein the memory is provided for storing a computer program; and the processor is provided for executing the program stored on the memory to carry out the steps of the method of claim 9.

13. A method for controlling transportation between warehouses, applicable to a target Robot Cooperative System, RCS, in a system for controlling transportation between warehouses, the system further comprising an Automated Guided Vehicle, AGV, and a source RCS, wherein the method comprises:
receiving a second transferring request sent by the AGV and taking control over the AGV, wherein before sending the second transferring request to the target RCS, the AGV receives, from the source RCS, first transportation information comprising information of a first to-be-transported object, transports the first object to a handover area, and sends a first transferring request to the source RCS; and
sending a location of a first target storage space to the AGV, such that the AGV transports the first to-be-transported object from the handover area to the first target storage space;
wherein before receiving a second transferring request sent by the AGV, the AGV receives a first address from the source RCS, the second transferring request corresponding to the first address;
wherein the handover area is an overlap of an area under the control of the source RCS and an area under the control of the target RCS, and the AGV located in the handover area can be under the control of both the source RCS and the target RCS.

14. An electronic device, comprising a processor and a memory, wherein the memory is provided for storing a computer program; and the processor is provided for executing the program stored on the memory to carry out the steps of the method of claim 13.

15. A system for controlling transportation between warehouses, comprising a source Robot Cooperative System, RCS, a target RCS, and an Automated Guided Vehicle, AGV; wherein
the source RCS is configured for sending, to the AGV, first transportation information which comprises information of a first to-be-transported object;
the AGV is configured for receiving the first transportation information from the source RCS, transporting the first to-be-transported object to a handover area, and sending a first transferring request to the source RCS;
the source RCS is further configured for receiving the first transferring request from the AGV and removing a control over the AGV;

the AGV is further configured for sending a second transferring request to the target RCS;

the target RCS is configured for receiving the second transferring request from the AGV and sending a location of a first target storage space to the AGV; and the AGV is further configured for receiving the location of the first target storage space from the target RCS and transporting the first to-be-transported object from the handover area to the first target storage space;

wherein before the AGV sends a second transferring request to the target RCS, the AGV receives a first address from the source RCS, the second transferring request corresponding to the first address;

wherein the handover area is an overlap of an area under the control of the source RCS and an area under the control of the target RCS, and the AGV located in the handover area can be under the control of both the source RCS and the target RCS.

16. The system of claim 15, wherein the AGV is further configured for sending a message of successful transportation to the target RCS after transporting the first to-be-transported object from the handover area to the first target storage space;

the target RCS is further configured for receiving the message of successful transportation from the AGV and sending second transportation information to the AGV, wherein the second transportation information comprises information of a second to-be-transported object;

the AGV is further configured for receiving the second transportation information from the target RCS, transporting the second to-be-transported object to the handover area, and sending a fourth transferring request to the target RCS;

the target RCS is further configured for receiving the fourth transferring request from the AGV and removing the control over the AGV;

the AGV is further configured for sending a third transferring request to the source RCS;

the source RCS is further configured for receiving the third transferring request from the AGV, taking control over the AGV, and sending a location of a second target storage space to the AGV; and the AGV is further configured for receiving the location of the second target storage space from the source RCS and transporting the second to-be-transported object to the second target storage space.

* * * * *